(12) United States Patent
Tanaka et al.

(10) Patent No.: US 11,212,529 B2
(45) Date of Patent: Dec. 28, 2021

(54) IMAGE PROCESSING APPARATUS AND IMAGE PROCESSING METHOD

(71) Applicant: SONY SEMICONDUCTOR SOLUTIONS CORPORATION, Kanagawa (JP)

(72) Inventors: Masao Tanaka, Kanagawa (JP); Tsuyoshi Kimura, Kanagawa (JP); Mikita Yasuda, Kanagawa (JP); Toshiharu Tsuchiya, Kanagawa (JP); Yasuyuki Chaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 17 days.

(21) Appl. No.: 16/639,196

(22) PCT Filed: May 22, 2018

(86) PCT No.: PCT/JP2018/019610
§ 371 (c)(1),
(2) Date: Feb. 14, 2020

(87) PCT Pub. No.: WO2019/039012
PCT Pub. Date: Feb. 28, 2019

(65) Prior Publication Data
US 2021/0160492 A1    May 27, 2021

(30) Foreign Application Priority Data
Aug. 23, 2017   (JP) .............................. JP2017-160394

(51) Int. Cl.
*H04N 19/119*    (2014.01)
*H04N 19/174*    (2014.01)
*H04N 19/51*     (2014.01)

(52) U.S. Cl.
CPC ......... *H04N 19/119* (2014.11); *H04N 19/174* (2014.11); *H04N 19/51* (2014.11)

(58) Field of Classification Search
CPC ..... H04N 19/119; H04N 19/51; H04N 19/174
See application file for complete search history.

(56) References Cited

U.S. PATENT DOCUMENTS

| | | | |
|---|---|---|---|
| 2015/0010069 A1* | 1/2015 | Guignard | H04N 19/166 375/240.12 |
| 2015/0023409 A1 | 1/2015 | Schierl et al. | |

(Continued)

FOREIGN PATENT DOCUMENTS

| | | |
|---|---|---|
| EP | 2842313 A2 | 3/2015 |
| EP | 3056008 A1 | 8/2016 |

(Continued)

OTHER PUBLICATIONS

Bross, et al., "WD5: Working Draft 5 of High-Efficiency Video Coding" Joint Collaborative Team on Video Coding (JCT-VC) of ITU-T SG16 WP3 and ISO/IEC JTC1/SC29/WG11, 7th meeting, Document: JCTVC-G1103_d9, Geneva, CH, Nov. 21-30, 2011, 05 pages.

(Continued)

*Primary Examiner* — Tat C Chio
(74) *Attorney, Agent, or Firm* — Chip Law Group

(57) ABSTRACT

An image processing apparatus and an image processing method are provided. The image processing apparatus includes: a division control unit that, on the basis of a first boundary dividing an image into a plurality of partial areas, further sets a second boundary and divides each of the partial areas into a plurality of slices; and an encoding unit that encodes the image on the basis of the first boundary and the second boundary, in which the division control unit sets the second boundary such that the plurality of slices included in the partial area has unequal numbers of lines, and the slice (Continued)

situated at the bottom among the plurality of slices included in the partial area is not a slice having the most lines in the partial area.

9 Claims, 20 Drawing Sheets

(56) References Cited

U.S. PATENT DOCUMENTS

2016/0241850 A1    8/2016  Deshpande
2019/0007680 A1*   1/2019  Chen .................. H04N 19/15

FOREIGN PATENT DOCUMENTS

| JP | 2007-060488 A | 3/2007 |
| JP | 2016-540400 A | 12/2016 |
| JP | 2017-022724 A | 1/2017 |
| JP | 2017-034664 A | 2/2017 |
| WO | 2013/153226 A2 | 10/2013 |
| WO | 2013/153227 A1 | 10/2013 |
| WO | 2015/052939 A1 | 4/2015 |

OTHER PUBLICATIONS

International Search Report and Written Opinion of PCT Application No. PCT/JP2018/019610, dated Jul. 24, 2018, 09 pages of ISRWO.

Bross, et al., "WD5: Working Draft 5 of High-efficiency Video Coding", Joint Collaborative Team on Video Coding (JCT-VC) of ITU-T SG16 WP3 and ISO/IEC JTC1/SC29/WG11, 7th meeting, Geneva, CH, Nov. 21-30, 2011, 05 pages.

* cited by examiner

IMAGE PROCESSING APPARATUS AND IMAGE PROCESSING METHOD

CROSS REFERENCE TO RELATED APPLICATIONS

This application is a U.S. National Phase of International Patent Application No. PCT/JP2018/019610 filed on May 22, 2018, which claims priority benefit of Japanese Patent Application No. JP 2017-160394 filed in the Japan Patent Office on Aug. 23, 2017. Each of the above-referenced applications is hereby incorporated herein by reference in its entirety.

TECHNICAL FIELD

The present disclosure relates to an image processing apparatus and an image processing method.

BACKGROUND ART

Motion compensation is performed in a technique related to image coding. The motion compensation is a technique including a search for a motion of a subject by an encoder, a search for a motion of a subject by the encoder, encoding and decoding of a motion vector, and generation of a predicted image based on the motion vector by a decoder. The higher the accuracy of the motion search by the encoder, the smaller a prediction error so that a high compression ratio can be obtained.

The technique related to image coding also performs division of a picture into a plurality of slices. For example, Patent Document 1 below describes a technique of performing slicing such that areas of slices overlap and thus enabling motion compensation to be executed such that image quality of a boundary part is improved.

CITATION LIST

Patent Document

Patent Document 1: Japanese Patent Application Laid-Open No. 2017-034664

SUMMARY OF THE INVENTION

Problems to be Solved by the Invention

However, if the slicing is performed such that the areas of the slices overlap, the overlapping areas are redundantly encoded so that an excessive processing load occurs and that processing efficiency can be reduced.

It is thus desirable to implement a slicing method for further improving the processing efficiency.

Solutions to Problems

According to the present disclosure, there is provided an image processing apparatus including: a division control unit that, on the basis of a first boundary dividing an image into a plurality of partial areas, further sets a second boundary and divides each of the partial areas into a plurality of slices; and an encoding unit that encodes the image on the basis of the first boundary and the second boundary, in which the division control unit sets the second boundary such that the plurality of slices included in the partial area has unequal numbers of lines, and the slice situated at the bottom among the plurality of slices included in the partial area is not a slice having the most lines in the partial area.

Moreover, according to the present disclosure, there is provided an image processing method including: on the basis of a first boundary dividing an image into a plurality of partial areas, further setting a second boundary and dividing each of the partial areas into a plurality of slices; and encoding the image on the basis of the first boundary and the second boundary, in which the second boundary is set such that the plurality of slices included in the partial area has unequal numbers of lines, and the slice situated at the bottom among the plurality of slices included in the partial area is not a slice having the most lines in the partial area.

Effects of the Invention

As described above, according to the present disclosure, the slicing method for further improving the processing efficiency can be implemented.

Note that the effect is not necessarily limited to the above effect, and any effect illustrated in the present specification or another effect that can be perceived from the present specification may be obtained along with or in place of the above effect.

MODE FOR CARRYING OUT THE INVENTION

Figure 1:
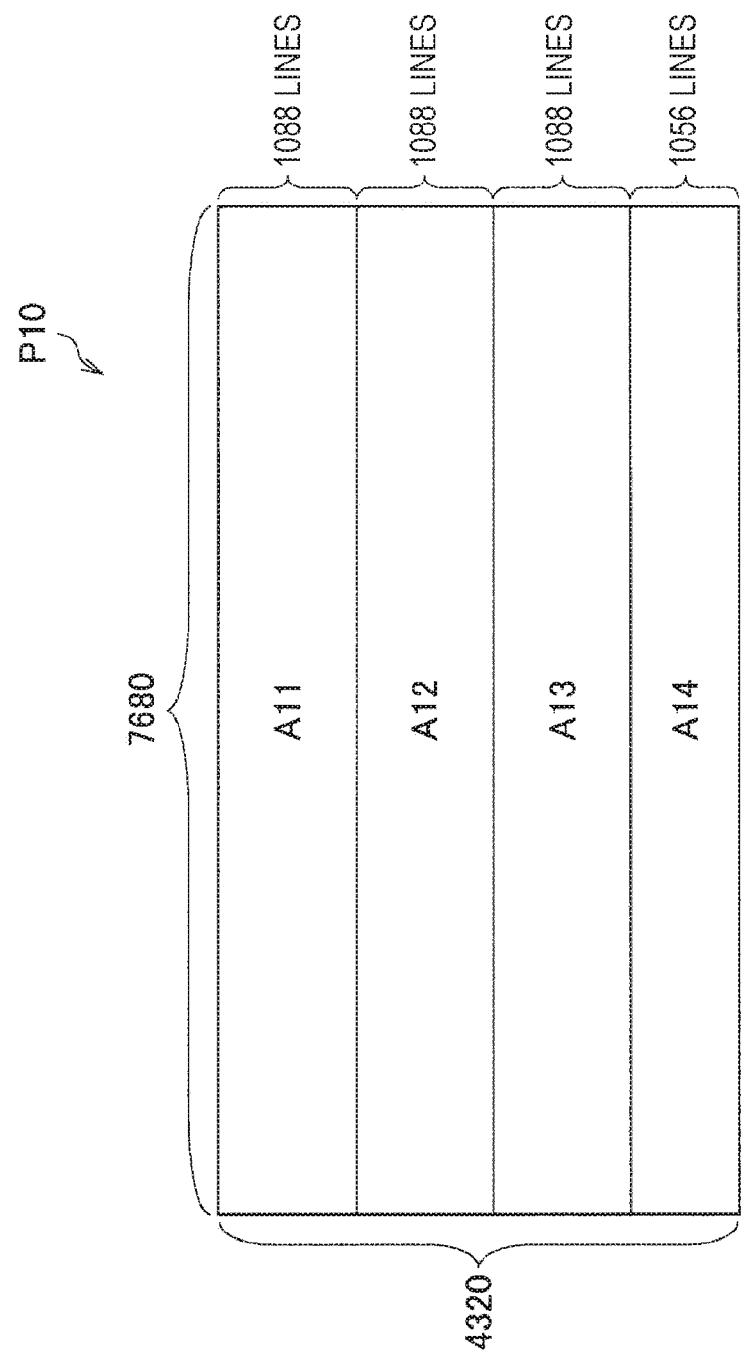
FIG. 1 is an explanatory diagram for explaining area division defined in ARIB STD-B32 version 3.2.

Hereinafter, a preferred embodiment of the present disclosure will be described in detail with reference to the drawings. Note that in the present specification and the drawings, components having substantially the same functional configuration will be assigned the same reference numeral, whereby redundant description will be omitted.

Furthermore, in the present specification and the drawings, a plurality of components having substantially the same functional configuration will be distinguished in some cases by affixing different alphabets to the same reference numeral. However, each of a plurality of components having substantially the same functional configuration will be assigned the same reference numeral only in a case where each of the components does not particularly need to be distinguished.

Note that the description will be made in the following order.

1. Overview
2. Configuration of image coding apparatus
3. Flow of processing in encoding
4. Configuration of image decoding apparatus
5. Flow of processing in decoding
6. Variation
7. Summary <1. Overview>

[1-1. Background]

In describing an embodiment of the present disclosure, first, the background that has led to the creation of the embodiment of the present disclosure will be described with reference to the drawings.

H.265/HEVC is known as an encoding system for efficiently encoding an image having a high resolution such as so-called an 8K resolution. Moreover, version 3.2 of STD-B32 "Video Coding, Audio Coding and Multiplexing Specifications for Digital Broadcasting", which is a standard of the Association of Radio Industries and Businesses (ARIB), defines the operational guidelines for the HEVC standard.

For example, ARIB STD-B32 version 3.2 defines an encoded video format for the 8K resolution such as the number of effective samples per line (horizontal resolution) of 7680, the number of effective lines per frame of 4320, and a frame frequency of 120 Hz (frame rate of 120 fps). Moreover, ARIB STD-B32 version 3.2 defines that temporal scalable coding is employed in the profile and level applied to the video format as described above. Furthermore, ARIB STD-B32 version 3.2 defines that a picture in the video format as described above is divided into a plurality of areas. FIG. 1 is an explanatory diagram for explaining area division defined in ARIB STD-B32 version 3.2. As illustrated in FIG. 1, ARIB STD-B32 version 3.2 defines that a screen (picture) having the 8K resolution (7680×4320) is divided into four areas of 7680×1088, 7680×1088, 7680× 1088, and 7680×1056. In the example illustrated in FIG. 1, a picture P1 is divided into four partial areas A11 to A14.

The division as described above is defined because it is considered difficult to achieve the performance of processing the entire screen (picture) within a time frame by one decoder in terms of hardware and software processing performance that can be achieved at the time when the standard is expected to be introduced. The overall performance is assumed to be achieved by using an apparatus or system, for example, an image decoding apparatus (decoder) including a plurality of chips (multi-chips), that divides the picture into the four areas as in FIG. 1 and performs processing in parallel for each area. Furthermore, similarly, for an image coding apparatus (encoder), it is desirable to assume parallel processing in a multi-chip configuration in terms of the processing performance. Note that in the case of the above video format, the frame frequency is 120 Hz so that the processing performance for completing the encoding processing or decoding processing of each frame within $\frac{1}{120}$ seconds≈8.33 seconds is required.

Meanwhile, motion compensation is one of important techniques for image coding. The motion compensation improves coding efficiency by referring to a signal of a highly correlated part that is shifted in time, that is, within a preceding or following frame, and using the amount of shift in a spatial direction, that is, a motion vector and a differential signal. The performance of the motion compensation depends on the size of a referenced range so that if a signal with as high a correlation as possible (with which the code amount of the differential signal is reduced) can be selected from a wider range of candidates, the coding efficiency is improved accordingly (especially for a mobile subject), which leads to improvement of the image quality.

Figure 2:
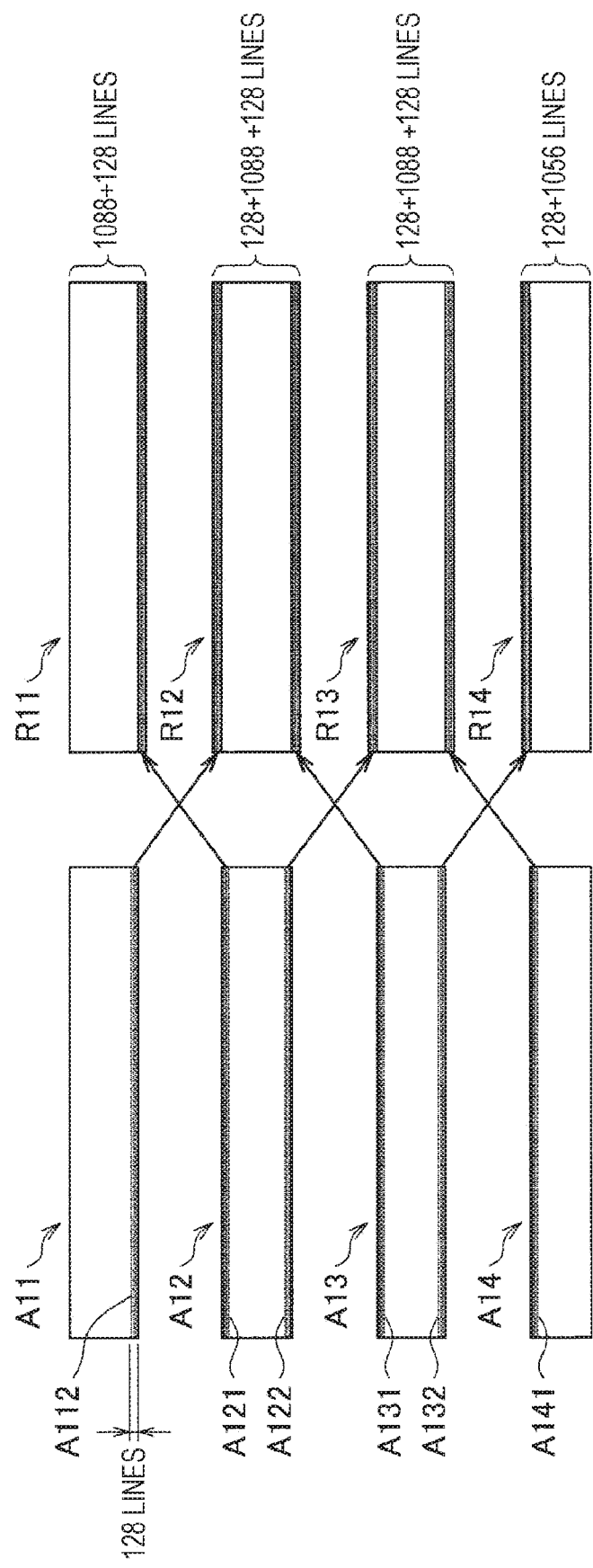
FIG. 2 is an explanatory diagram for explaining a referenced range in motion compensation processing performed with respect to another area, as defined in ARIB STD-B32 version 3.2.

In a case where the parallel processing is performed for each of the areas divided as described above, it is important to refer to an area assigned to another chip in order to improve the image quality. ARIB STD-B32 version 3.2 also defines motion compensation processing with another area that is divided as in FIG. 1. FIG. 2 is an explanatory diagram for explaining the referenced range in the motion compensation processing performed with respect to another area, as defined in ARIB STD-B32 version 3.2.

As illustrated in FIG. 2, ARIB STD-B32 version 3.2 defines that in the decoding processing, the motion compensation processing is performed with reference to other areas by the width of 128 lines at the top and the bottom. FIG. 2 illustrates referenced ranges R11 to R14 that are referenced in order to perform the motion compensation processing related to the partial areas A11 to A14. Note that the partial areas A11 to A14 illustrated in FIG. 2 are the partial areas A11 to A14 set by dividing the picture P1 illustrated in FIG. 1 into four parts. Moreover, the referenced ranges R11 to R14 illustrated in FIG. 2 indicate ranges in decoded image data that is obtained by decoding the partial areas A11 to A14 in frames preceding and following a target of the motion compensation processing.

In the example illustrated in FIG. 2, the referenced range R11 for performing the motion compensation processing related to the partial area A11 includes upper 128 lines (an upper area A121) of the partial area A12 in addition to the partial area A11, thereby having 1088+128=1216 lines. Similarly, the referenced range R12 for performing the motion compensation processing related to the partial area A12 includes lower 128 lines (a lower area A112) of the partial area A11 and upper 128 lines (an upper area A131) of the partial area A13 in addition to the partial area A12, thereby having 128+1088+128=1344 lines. Similarly, the referenced range R13 for performing the motion compensation processing related to the partial area A13 includes lower 128 lines (a lower area A122) of the partial area A12 and upper 128 lines (an upper area A141) of the partial area A14 in addition to the partial area A13, thereby having 128+1088+128=1344 lines. Similarly, the referenced range R14 for performing the motion compensation processing related to the partial area A14 includes lower 128 lines (a lower area A132) of the partial area A13 in addition to the partial area A14, thereby having 128+1056=1184 lines.

Note that although the decoding processing has been described above, it is also desirable in the encoding processing to perform the motion compensation processing by setting referenced ranges similar to those described above in decoded image data that is obtained by local decoding processing.

Furthermore, in the present specification, the video format subjected to processing is not limited to the example defined in ARIB STD-B32 version 3.2, and the 8K resolution in the present specification is not limited to the 7680×4320 resolution described above. For example, in the present specification, the 8K resolution is used as an expression that can include a resolution of 8192×4320. In a case where the description is made with reference to the partial areas A11 to A14 illustrated in FIGS. 1 and 2 in the following description, the horizontal resolution of the partial areas A11 to A14 is not limited to 7680 as illustrated in FIG. 1, but may be 8192.

Figure 3:
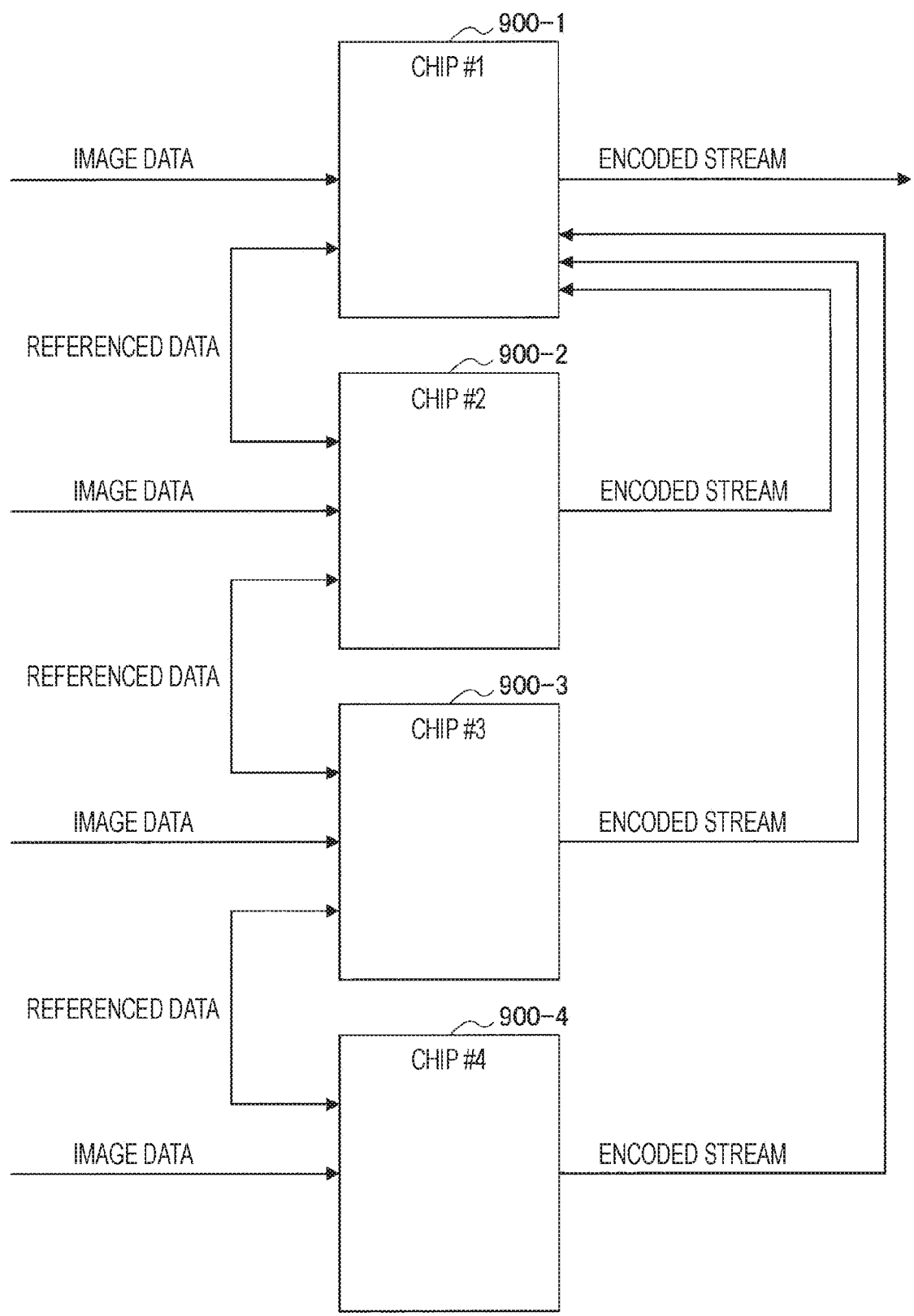
FIG. 3 is an explanatory diagram for explaining an example of a multi-chip configuration in a case where one chip performs encoding processing on one partial area.

Next, a multi-chip configuration of the image processing apparatus for performing the encoding processing or the decoding processing on the partial areas A11 to A14, which are obtained by the division into fourths as described above, will be examined. FIG. 3 is an explanatory diagram for explaining an example of the multi-chip configuration in a case where one chip performs the encoding processing on one partial area.

In the example illustrated in FIG. 3, the encoding processing of the partial areas A11 to A14 illustrated in FIG. 1 is performed by four chips being a chip 900-1, a chip 900-2, a chip 900-3, and a chip 900-4, respectively. Image data of the partial areas A11 to A14 is input to the chip 900-1, the chip 900-2, the chip 900-3, and the chip 900-4, respectively. Note that the area assigned to each chip does not change between frames so that the image data of the same partial area can be input to each chip throughout the frames.

The image data input to each chip is encoded by each chip, and an encoded stream is output from each chip. Note that in the example illustrated in FIG. 3, the chip 900-1 receives the encoded stream generated by each chip from each of the chip 900-2, the chip 900-3, and the chip 900-4. Then, the chip 900-1 combines the received encoded streams with the encoded stream corresponding to the partial area A11 generated by the chip 900-1, and outputs an encoded stream corresponding to the entire screen.

Each chip also generates decoded image data by local decoding processing and performs motion compensation processing using the decoded image data as referenced data. Here, the area assigned to another chip needs to be referenced as described with reference to FIG. 2, so that the referenced data is transferred between the chips as illustrated in FIG. 3.

For example, from the chip 900-1 to the chip 900-2, the decoded image data of the lower area A112 (the lower 128 lines of the part A11) described with reference to FIG. 2 is transferred as the referenced data at 120 fps. Moreover, in a similar manner, from the chip 900-2 to the chip 900-1, for example, the decoded image data of the upper area A121 (the upper 128 lines of the partial area A12) described with reference to FIG. 2 is transferred as the referenced data at 120 fps. The transfer between the other chips is performed in a similar manner and thus will not be described.

Here, in further examination of the processing performance of the chip, it is desirable that parallel processing be performed within the chip in order to process the area assigned to each chip (for example, 8192×1088 pixels) at 120 fps. One can thus consider a multi-core configuration in which each chip includes a plurality of codec cores (hereinafter also simply referred to as cores) that performs encoding processing or decoding processing, for example.

In the case of the multi-core configuration, for the purpose of evenly distributing the processing load to each core, the area assigned to each chip can be divided equally to set an area assigned to each core included in each chip. Note that in the following, the area assigned to each core will be called a slice, and dividing a picture or a partial area into slices will be called slicing in some cases.

Figure 4:
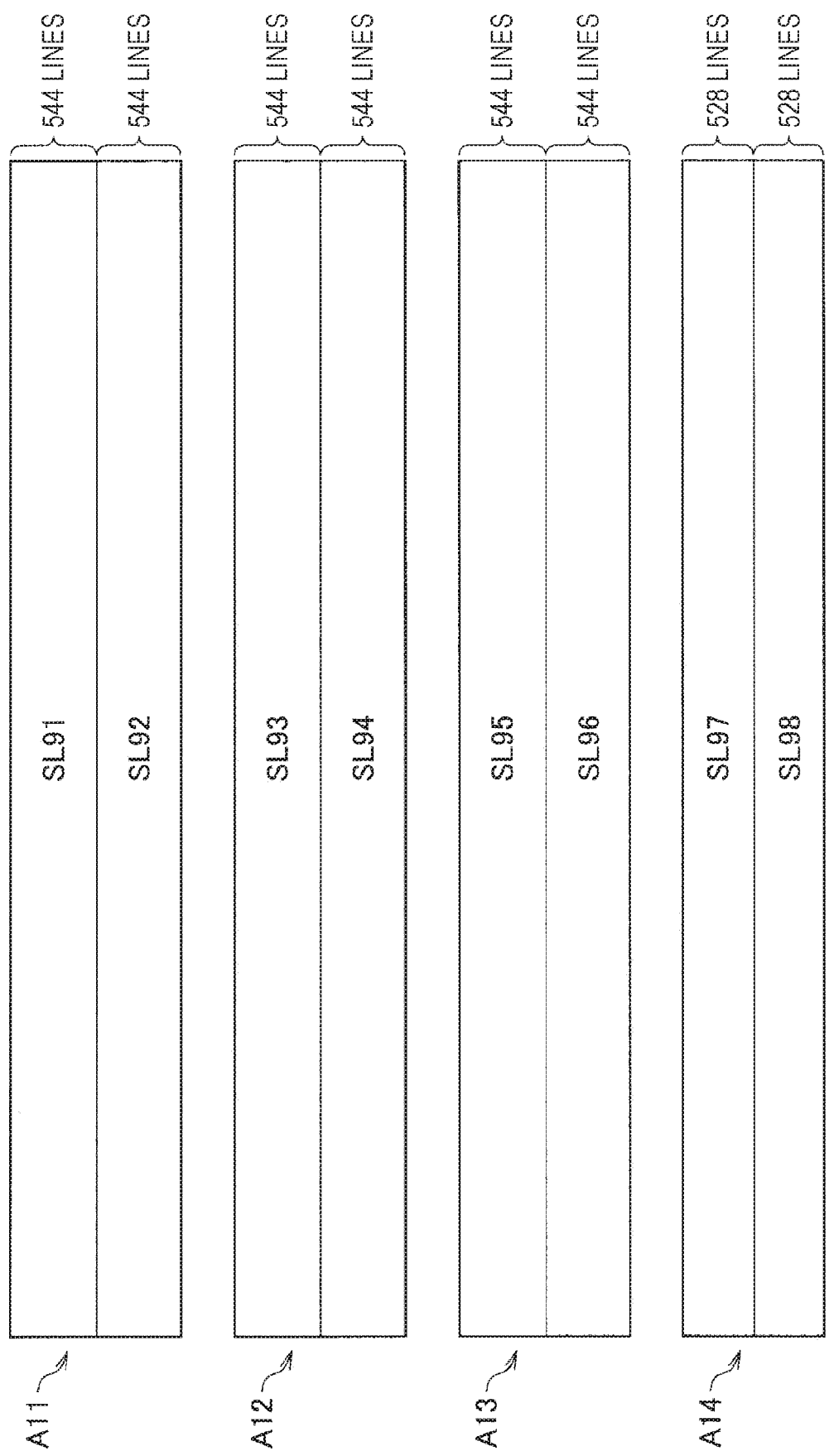
FIG. 4 is a diagram illustrating an example of slicing in a case where each chip has two cores.

FIG. 4 is a diagram illustrating an example of slicing in a case where each chip has two cores. As illustrated in FIG. 4, each of the partial areas A11 to A14 illustrated in FIG. 1 is equally divided into two, whereby slices SL91 to SL98 are obtained.

Figure 5:
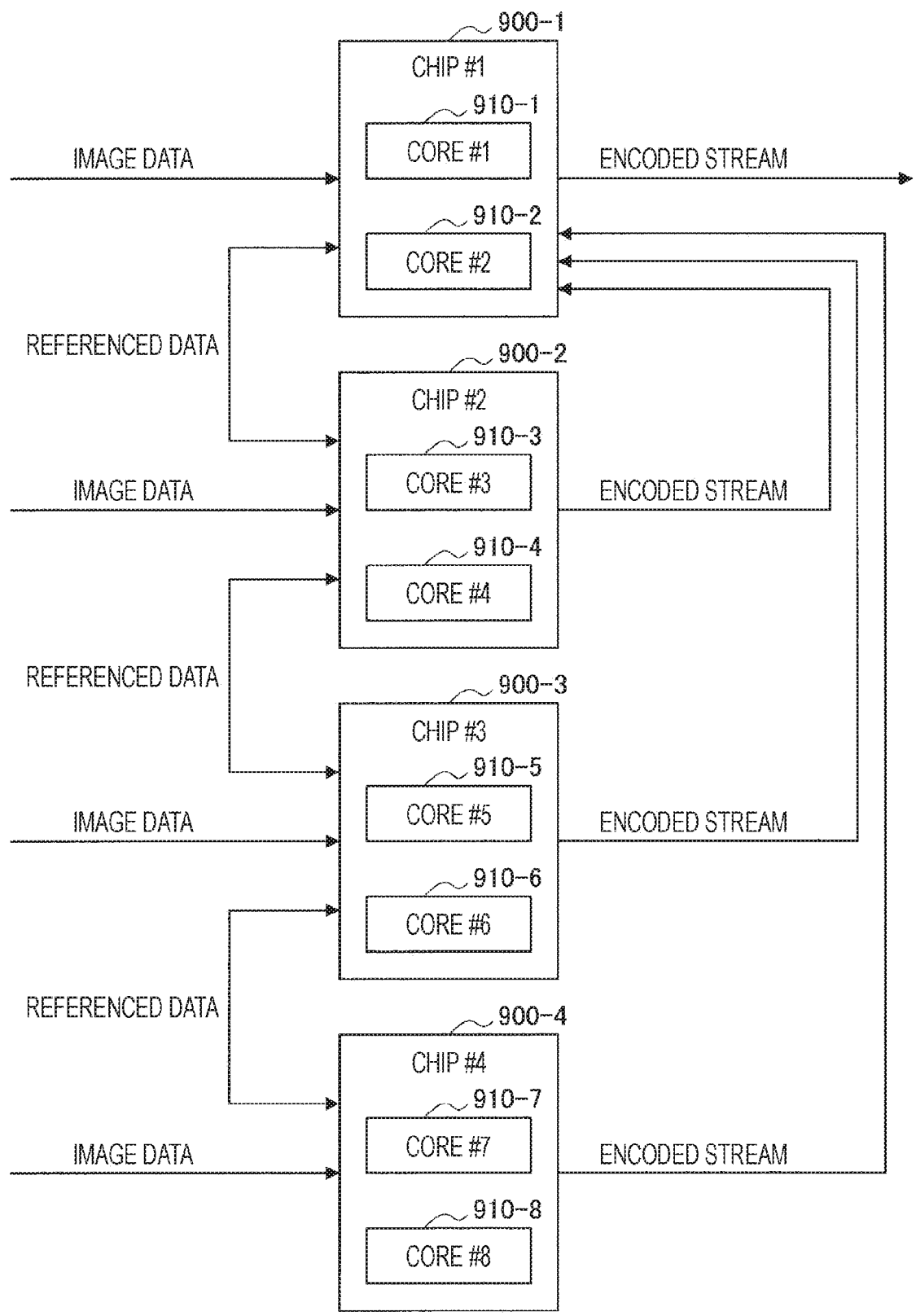
FIG. 5 is an explanatory diagram for explaining an example of a configuration in a case where each chip has two cores in the example of the multi-chip configuration.

FIG. 5 is an explanatory diagram for explaining an example of a configuration in a case where each chip has two cores in the example of the multi-chip configuration illustrated in FIG. 3. In the example illustrated in FIG. 5, the chip 900-1 has a core 910-1 and a core 910-2, where the core 910-1 is in charge of processing the slice SL91 illustrated in FIG. 4, and the core 910-2 is in charge of processing the slice SL92 illustrated in FIG. 4.

Similarly, the chip 900-2 has a core 910-3 and a core 910-4, where the core 910-3 is in charge of processing the slice SL93 illustrated in FIG. 4, and the core 910-4 is in charge of processing the slice SL94 illustrated in FIG. 4. Similarly, the chip 900-3 has a core 910-5 and a core 910-6, where the core 910-5 is in charge of processing the slice SL95 illustrated in FIG. 4, and the core 910-6 is in charge of processing the slice SL96 illustrated in FIG. 4. Similarly, the chip 900-4 has a core 910-7 and a core 910-8, where the core 910-7 is in charge of processing the slice SL95 illustrated in FIG. 4, and the core 910-8 is in charge of processing the slice SL96 illustrated in FIG. 4.

Figure 6:
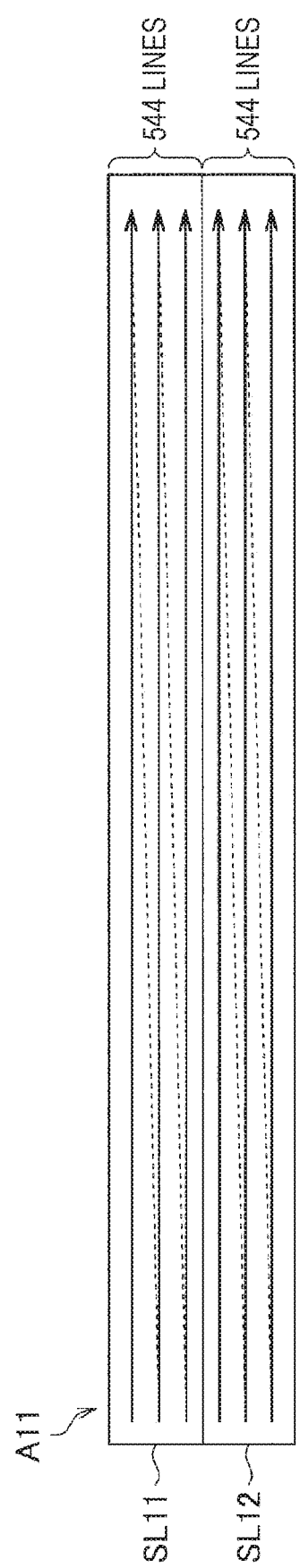
FIG. 6 is an explanatory diagram for explaining an order of processing.

Here, the encoding processing in each core is performed according to raster scan order starting from an upper left for each block such as a macroblock (MB) in AVC or a coding tree unit (CTU) in HEVC. FIG. 6 is an explanatory diagram for explaining the order of processing. The example illustrated in FIG. 6 illustrates the order of processing of a slice SL11 and the order of processing of a slice SL12 by the core 910-1 and the core 910-2 in the partial area A11 that the chip 900-1 is in charge of. As illustrated in FIG. 6, the processing is performed from an upper left to a lower right in each slice. Therefore, a lower end portion of each slice is processed last.

Here, for example, the lower area A112 described with reference to FIG. 2 corresponds to lower 128 lines of the slice SL12, and is thus a portion processed last by the core 910-2. Considering dependency of the order of processing, the processing of the lower area A112 needs to be completed with a decoded image of the lower area A112 transferred to the chip 900-2 as the referenced data, before processing of a next frame is started. Therefore, the time taken for the transfer affects the overall processing time.

Figure 7:
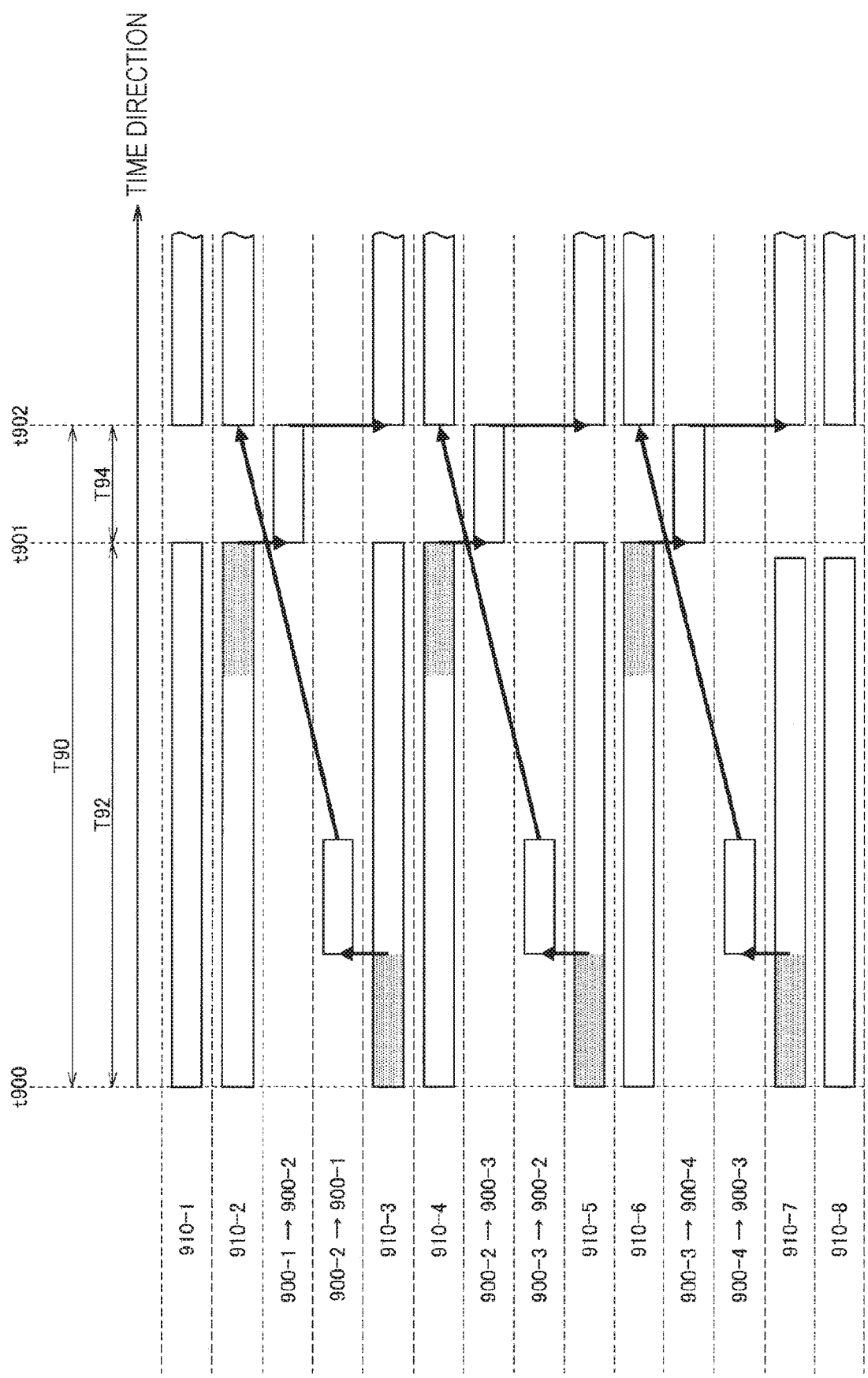
FIG. 7 is a timing diagram illustrating an example of a timing for encoding processing in each core and for transfer of referenced data between chips.

FIG. 7 is a timing diagram illustrating an example of a timing for the encoding processing in each core and for the transfer of the referenced data between chips. FIG. 7 illustrates a timing for the encoding processing in each of the cores 910-1 to 910-8, and a timing for the transfer of the referenced data between chips (between the chip 900-1 and the chip 900-2, between the chip 900-2 and the chip 900-3, and between the chip 900-3 and the chip 900-4). Moreover, although FIG. 7 illustrates the case of the encoding processing as an example, the similar applies to the case of the decoding processing.

In the example illustrated in FIG. 7, a period T92 is required from the start of processing of a processing target frame at time t900 to time t901 at which the processing by the cores 910-1 to 910-6 is completed. Then, a period T94 is required from time t901 to time t902 at which the transfer of the referenced data generated by the core 910-2, the core 910-4, and the core 910-6 is completed. Therefore, a period T90 that is the processing time from the processing start time t900 for the current frame to the processing start time t902 for a next frame is a sum of the period T92 and the period T94. In a case where the frame rate is 120 fps, for example, the period T90 is $\frac{1}{120}$=about 8.33 seconds or less.

As illustrated in FIG. 7, the transfer of the referenced data generated by the core 910-3, the core 910-5, and the core 910-7 in charge of the lower slices in the areas assigned to the chips 900-2 to 900-4 is performed in parallel with the processing of each core. On the other hand, the transfer of the referenced data generated by the core 910-2, the core 910-4, and the core 910-6 in charge of the lower slices in the areas assigned to the chips 900-1 to 900-3 is started after the processing of the cores generating the referenced data is completed. This is because, as described above, the lower end portion that can be the referenced data in the lower slice of the area assigned to each chip is processed last. Therefore, the referenced data generated is transferred after the processing in the core 910-2, the core 910-4, and the core 910-6 is completed, and the processing of a next frame cannot be started until the transfer is completed.

Thus, it is disadvantageous in terms of cutting the overall processing time to not perform the transfer of the referenced data generated by the core 910-2, the core 910-4, and the core 910-6 in parallel with the processing of each core. In order to cut the overall processing time, it is necessary to increase a circuit scale to enhance the processing performance of each core, use a high-speed and expensive memory to secure a memory bandwidth, and increase power consumption to raise an operating frequency, which leads to an increase in cost. Furthermore, frame dropping occurs if the processing of each frame cannot be completed within a predetermined time (for example, 8.33 seconds in a case where the frame rate is 120 fps). Alternatively, if the amount of processing for motion compensation is decreased in order to cut the processing time, the image quality is possibly degraded.

Figure 8:
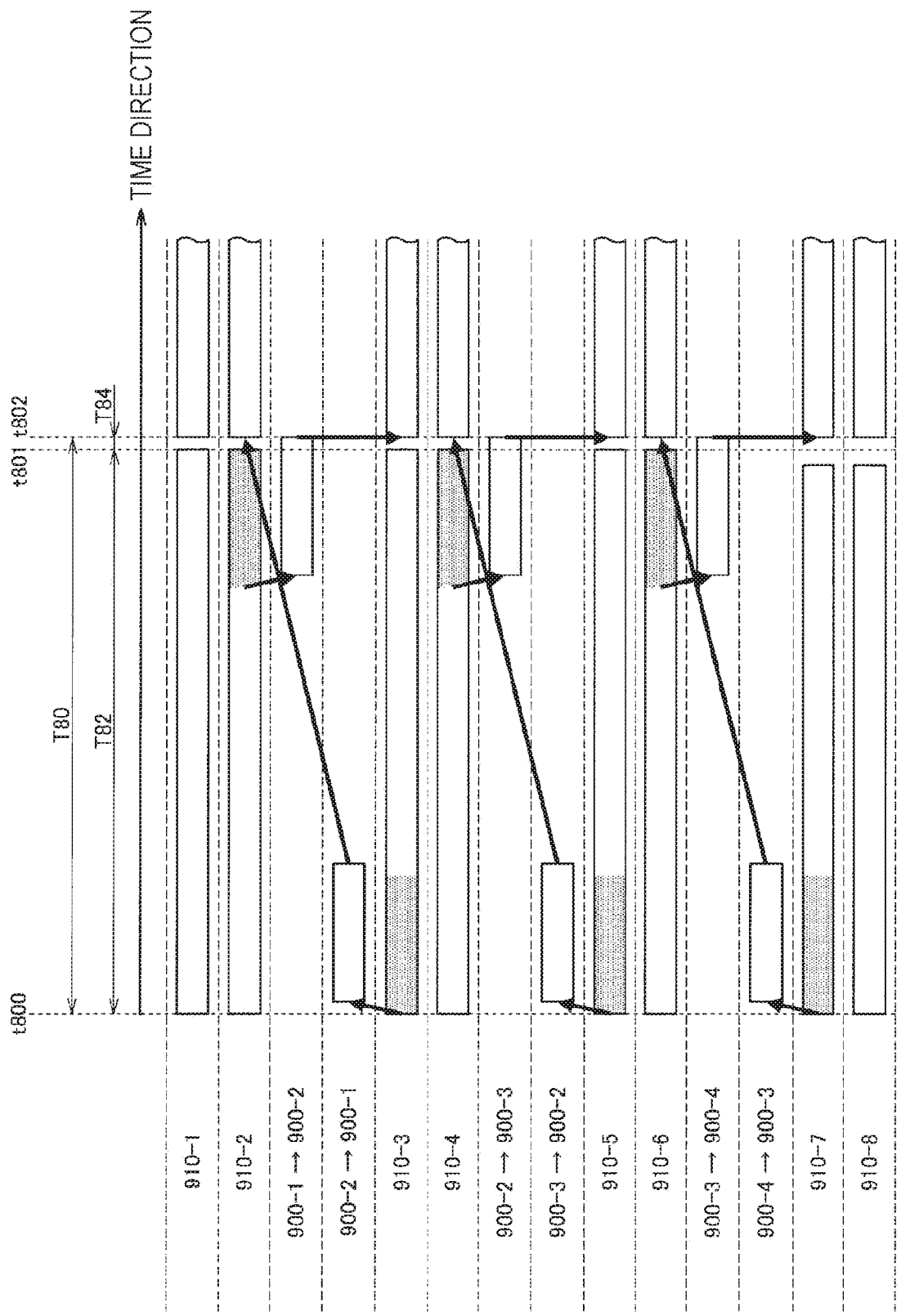
FIG. 8 is a timing diagram illustrating an example of a timing for encoding processing in each core and for transfer of referenced data between chips, in a case where the referenced data is transferred one by one.

On the other hand, instead of starting the transfer after all the referenced data to be transferred is generated (decoded), the data can be transferred one by one as it is generated on a CTU basis, for example. FIG. 8 is a timing diagram illustrating an example of a timing for the encoding processing in each core and for the transfer of the referenced data between chips, in a case where the referenced data is transferred one by one. As with FIG. 7, FIG. 8 illustrates the timing for the encoding processing in each of the cores 910-1 to 910-8, and the timing for the transfer of the referenced data between chips.

In the example illustrated in FIG. 8, as with the example illustrated in FIG. 7, a period T82 is required from the start of processing of a processing target frame at time t800 to time t801 at which the processing by the cores 910-1 to 910-6 is completed. Here, the period T82 is the same as the period T92 illustrated in FIG. 7. However, in the example illustrated in FIG. 8, the referenced data starts to be transferred one by one between the chips as soon as being generated, whereby the transfer of the referenced data generated by the core 910-2, the core 910-4, and the core 910-6 can be performed in parallel with the processing of each core. Accordingly, the period in which only chip transfer is performed in FIG. 8 corresponds to a period T84 from time t801 to time t802, and this period T84 is shorter than the period T94 illustrated in FIG. 7. Therefore, a period T80 that is the processing time from the processing start time t800 for the current frame to the processing start time t802 for a next frame is a sum of the period T82 and the period T84, and is shorter than the period T90 illustrated in FIG. 7.

However, if the referenced data is to be transferred one by one, the amount of processing required for controlling the transfer and the like increases, whereby it is assumed to be difficult to achieve the processing with the processing time as illustrated in FIG. 8. Moreover, in order to avoid such an increase in the amount of processing, the transfer granularity needs to be expanded to an appropriate size (for example, a unit of 64 lines), so that the period of performing only transfer is increased after all and that the overall processing time can be increased.

Accordingly, the present embodiment has been created while focusing on the above circumstances. The image processing apparatus according to the present embodiment can cut the overall processing time by performing slicing such that a slice situated at the bottom in a partial area processed by each chip is not a slice having the most lines in the partial area. Hereinafter, the configuration and operation of an embodiment of the present disclosure having such an effect will be sequentially described in detail.

<2. Configuration of Image Coding Apparatus>

[2-1. Logical Configuration]

(Overall Configuration)

Figure 9:
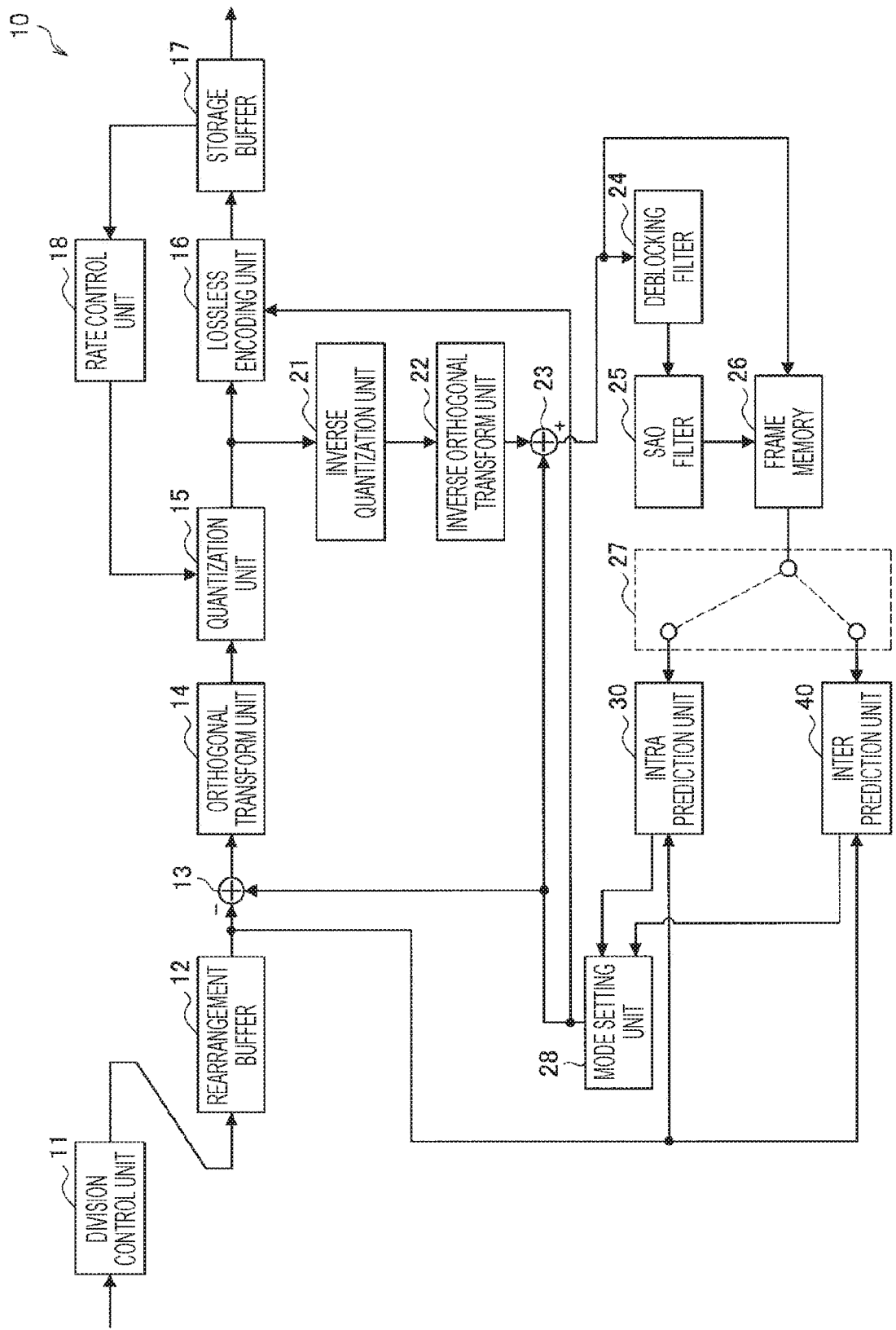
FIG. 9 is a block diagram illustrating an example of a configuration of logical functions of an image coding apparatus 10 that is an aspect of an image processing apparatus according to an embodiment of the present disclosure.

FIG. 9 is a block diagram illustrating an example of a configuration of logical functions of an image coding apparatus 10 that is an aspect of the image processing apparatus according to the present embodiment.

Referring to FIG. 9, the image coding apparatus 10 includes a division control unit 11, a rearrangement buffer 12, a subtraction unit 13, an orthogonal transform unit 14, a quantization unit 15, a lossless encoding unit 16, a storage buffer 17, a rate control unit 18, an inverse quantization unit 21, an inverse orthogonal transform unit 22, an addition unit 23, a deblocking filter 24, an SAO filter 25, a frame memory 26, a switch 27, a mode setting unit 28, an intra prediction unit 30, and an inter prediction unit 40.

The division control unit 11 sets a slice boundary for each image corresponding to a picture, and divides the picture into a plurality of slices. The division control unit 11 also generates a slicing parameter indicating a mode of slicing, and outputs the slicing parameter generated to the lossless encoding unit 16.

Note that the processing of the subtraction unit 13 to the inter prediction unit 40, which will be described later, is executed by a core assigned for each slice to be in charge of the slice on the basis of the slice boundary set by the division control unit 11. Also, a more detailed configuration of the division control unit 11 will be described later with reference to FIG. 10.

The rearrangement buffer 12 rearranges image data of a series of images forming a video to be encoded according to a group of pictures (GOP) structure related to encoding processing. The rearrangement buffer 12 outputs the image data that has been rearranged to the subtraction unit 13. Note that the order of processing of the division control unit 11 and the rearrangement buffer 12 is not particularly limited, and may be reversed.

The subtraction unit 13 calculates prediction error data that is a difference between the image data input from the rearrangement buffer 12 and predicted image data, and outputs the prediction error data calculated to the orthogonal transform unit 14.

The orthogonal transform unit 14 executes orthogonal transform processing on each of one or more transform blocks set in each slice. The orthogonal transform here may be, for example, discrete cosine transform or discrete sine transform. More specifically, the orthogonal transform unit 14 transforms the prediction error data input from the subtraction unit 13 from an image signal in a spatial domain into a transform coefficient in a frequency domain for each transform block. The orthogonal transform unit 14 then outputs the transform coefficient to the quantization unit 15.

The quantization unit 15 receives transform coefficient data input from the orthogonal transform unit 14 and a rate control signal from the rate control unit 18 described later. The quantization unit 15 quantizes the transform coefficient data in a quantization step determined according to the rate control signal. The quantization unit 15 outputs the transform coefficient data that has been quantized (hereinafter referred to as quantized data) to the lossless encoding unit 16 and the inverse quantization unit 21.

The lossless encoding unit 16 generates an encoded stream by encoding the quantized data input from the quantization unit 15 for each slice. The lossless encoding unit 16 also encodes various parameters referred to by a decoder, and inserts the encoded parameters into the encoded stream. The parameters encoded by the lossless encoding unit 16 can include the slicing parameter described above, information associated with intra prediction, and information associated with inter prediction. The lossless encoding unit 16 outputs the encoded stream generated to the storage buffer 17.

The storage buffer 17 temporarily stores the encoded stream input from the lossless encoding unit 16 using a storage medium such as a semiconductor memory. Then, the storage buffer 17 outputs the encoded stream stored therein to a transmission unit not shown (for example, a communication interface or a connection interface with a peripheral device) at a rate corresponding to the bandwidth of a transmission path.

The rate control unit 18 monitors free space of the storage buffer 17. The rate control unit 18 then generates the rate control signal according to the free space of the storage buffer 17, and outputs the rate control signal generated to the quantization unit 15. When the free space in the storage buffer 17 is small, for example, the rate control unit 18 generates the rate control signal for lowering the bit rate of the quantized data. Moreover, when the free space in the storage buffer 17 is large enough, for example, the rate control unit 18 generates the rate control signal for increasing the bit rate of the quantized data.

The inverse quantization unit 21, the inverse orthogonal transform unit 22, and the addition unit 23 make up a local decoder. The local decoder has a role of locally decoding the encoded data to obtain decoded image data.

The inverse quantization unit 21 performs inverse quantization on the quantized data with the same quantization parameter as that used by the quantization unit 15, thereby restoring the transform coefficient data. Then, the inverse quantization unit 21 outputs the transform coefficient data restored to the inverse orthogonal transform unit 22.

The inverse orthogonal transform unit 22 executes inverse orthogonal transform processing on the transform coefficient data input from the inverse quantization unit 21, thereby restoring the prediction error data. Then, the inverse orthogonal transform unit 22 outputs the prediction error data restored to the addition unit 23.

The addition unit 23 adds the restored prediction error data input from the inverse orthogonal transform unit 22 and the predicted image data input from the intra prediction unit 30 or the inter prediction unit 40, thereby generating the decoded image data (a reconstructed image). The addition unit 23 then outputs the decoded image data generated to the deblocking filter 24 and the frame memory 26.

Each of the deblocking filter 24 and the SAO filter 25 is an in-loop filter that aims to improve the image quality of the reconstructed image. The deblocking filter 24 removes block distortion by filtering the decoded image data input from the addition unit 23, and outputs the decoded image data that has been filtered to the SAO filter 25. The SAO filter 25 removes noise by applying edge offset processing or band offset processing to the decoded image data input from the deblocking filter 24, and outputs the decoded image data that has been processed to the frame memory 26.

The frame memory 26 uses a storage medium to store the decoded image data before filtering that is input from the addition unit 23, and the decoded image data after application of the in-loop filter that is input from the SAO filter 25.

The switch 27 reads the decoded image data before filtering to be used for intra prediction from the frame memory 26, and supplies the decoded image data that has been read to the intra prediction unit 30 as referenced data. The switch 27 also reads the decoded image data after filtering to be used for inter prediction from the frame memory 26, and supplies the decoded image data that has been read to the inter prediction unit 40 as referenced data.

The mode setting unit 28 sets a prediction coding mode for each block on the basis of a comparison of costs input from the intra prediction unit 30 and the inter prediction unit 40. For the block for which an intra prediction mode is set, the mode setting unit 28 outputs the predicted image data generated by the intra prediction unit 30 to the subtraction unit 13 and outputs the information associated with intra prediction to the lossless encoding unit 16. Moreover, for the block for which an inter prediction mode is set, the mode setting unit 28 outputs the predicted image data generated by the inter prediction unit 40 to the subtraction unit 13 and outputs the information associated with inter prediction to the lossless encoding unit 16.

The intra prediction unit 30 executes intra prediction processing on the basis of original image data and the decoded image data. For example, the intra prediction unit 30 evaluates cost based on the prediction error and a code amount that occurs for each prediction mode candidate included in a search range. Next, the intra prediction unit 30 selects a prediction mode with the minimum cost as an optimal prediction mode. The intra prediction unit 30 also generates the predicted image data according to the optimal prediction mode selected. Then, the intra prediction unit 30 outputs the information associated with intra prediction including prediction mode information that indicates the optimal prediction mode, the corresponding cost, and the predicted image data to the mode setting unit 28.

The inter prediction unit 40 executes inter prediction processing (motion compensation) on the basis of original image data and the decoded image data. For example, the inter prediction unit 40 evaluates cost based on the prediction error and a code amount that occurs for each prediction mode candidate included in a search range specified by HEVC. Next, the inter prediction unit 40 selects a prediction mode with the minimum cost, that is, a prediction mode with the highest compression ratio, as an optimal prediction mode. The inter prediction unit 40 also generates the predicted image data according to the optimal prediction mode selected. Then, the inter prediction unit 40 outputs the information associated with inter prediction, the corresponding cost, and the predicted image data to the mode setting unit 28.

(Configuration of Division Control Unit)

Figure 10:
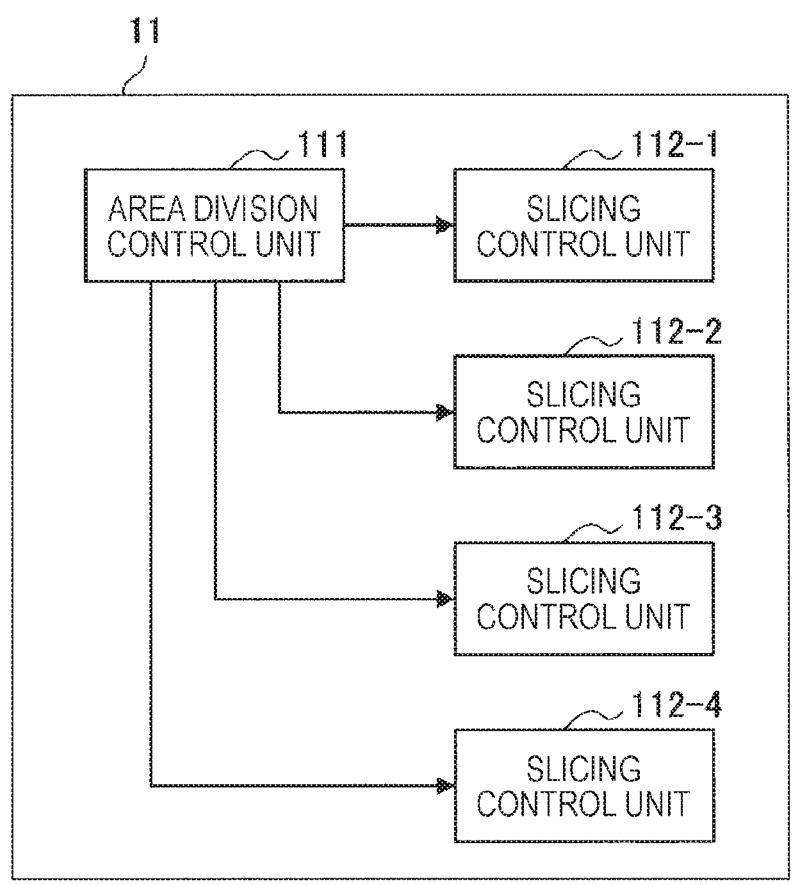
FIG. 10 is a block diagram illustrating an example of a detailed configuration of a division control unit.

FIG. 10 is a block diagram illustrating an example of a detailed configuration of the division control unit 11 illustrated in FIG. 9. Referring to FIG. 10, the division control unit 11 includes an area division control unit 111 and slicing control units 112-1 to 112-4.

The area division control unit 111 sets a boundary on an image and divides a picture (image) into a plurality of partial areas. Hereinafter, the boundary set by the area division control unit 111 will be referred to as a first boundary in some cases. The area division control unit 111 may set a plurality of first boundaries.

Each of the partial areas divided by the first boundary may be an area encoded by one chip, as described above. That is, one chip may encode one partial area. In a case where the image coding apparatus 10 includes four chips, for example, the area division control unit 111 may set three first boundaries and divide a picture (image) into four partial areas as illustrated in FIG. 1.

The slicing control units 112-1 to 112-4 further set a second boundary on the basis of the first boundary set by the area division control unit 111 for dividing an image into a plurality of partial areas, and divide each of the partial areas into a plurality of slices. Each of the slicing control units 112-1 to 112-4 may correspond to one chip and divide one partial area into a plurality of slices. Moreover, the plurality of slices divided by the slicing control units 112-1 to 112-4 may each be an area encoded by one core. That is, each core may encode one slice specified on the basis of the first boundary and the second boundary. In a case where each chip has two cores, for example, the slicing control units 112-1 to 112-4 may set one second boundary and divide each partial area into two slices.

Since the slice is obtained by the division as described above, the first boundary is a boundary of the partial area and also a boundary of the slice (slice boundary). Moreover, the second boundary is a boundary of the slice (slice boundary).

Figure 11:
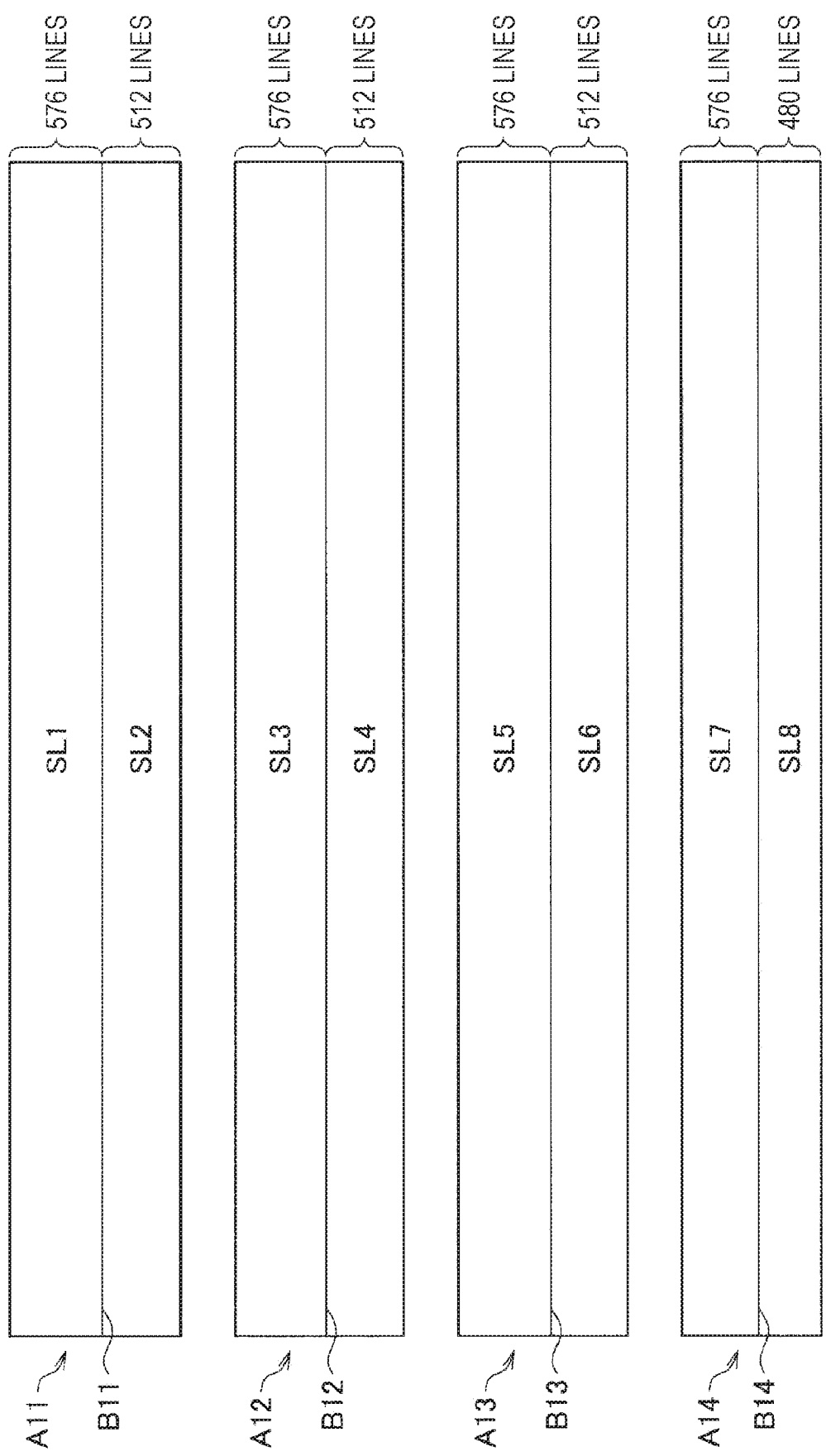
FIG. 11 is an explanatory diagram for explaining an example of slicing by slicing control units 112-1 to 112-4.

FIG. 11 is an explanatory diagram for explaining an example of slicing by the slicing control units 112-1 to 112-4. For example, the slicing control units 112-1 to 112-4 may set the second boundaries for the partial areas A11 to A14, respectively. That is, in the example of FIG. 11, a second boundary B11 is set by the slicing control unit 112-1 so that the partial area A11 is divided into a slice SL1 and a slice SL2. Similarly, a second boundary B12 is set by the slicing control unit 112-2 so that the partial area A12 is divided into a slice SL3 and a slice SL4. Similarly, a second boundary B13 is set by the slicing control unit 112-3 so that the partial area A13 is divided into a slice SL5 and a slice SL6. Similarly, a second boundary B14 is set by the slicing control unit 112-4 so that the partial area A14 is divided into a slice SL7 and the slice SL7.

As illustrated in FIG. 11, the slicing control units 112-1 to 112-4 may set the second boundaries such that the plurality of slices included in each of the partial areas A11 to A14 has unequal numbers of lines. The slicing control units 112-1 to 112-4 may also set the second boundaries such that the slice situated at the bottom among the plurality of slices included in each partial area is not the slice having the most lines in the partial area. Note that in the following, the slice situated at the bottom among the plurality of slices included in the partial area will be sometimes referred to as the lowest slice pertaining to the partial area, or simply the lowest slice.

In the example illustrated in FIG. 11, for example, the slice SL2 being the slice situated at the bottom between the slices SL1 and SL2 included in the partial area A11 is not the slice having the most lines in the partial area A11. The similar applies to the slices included in the partial areas A12 to A14.

The slicing is performed in such a manner so that, among the cores included in each chip, the core in charge of encoding the lowest slice pertaining to the partial area assigned to the chip can have less processing load than the other cores. Therefore, the encoding processing of the lowest slice can be completed earlier than the encoding processing of the other slices. Then, when decoded image data obtained by decoding a lower area of the lowest slice is transferred between chips as referenced data, the transfer can be performed simultaneously in parallel with the encoding processing of another slice. As a result, the overall processing time can be cut down.

Note that although the above description has described an example of the case where the image coding apparatus 10 includes four chips with each chip having two cores, the present technology is not limited to such an example. For example, although FIG. 10 illustrates the example in which the division control unit 11 includes the four slicing control units 112-1 to 112-4, the slicing control unit may correspond in number to the number of chips included in the image coding apparatus 10.

Furthermore, the slicing control units 112-1 to 112-4 may each set the second boundary such that the partial area is divided into the number of slices corresponding to the number of cores included in the corresponding chip. For example, in a case where the corresponding chip has three or more cores, the slicing control units 112-1 to 112-4 may each set two or more second boundaries such that the partial area is divided into slices equal in number to the number of cores.

Furthermore, the slicing by the slicing control units 112-1 to 112-4 is not limited to the example of FIG. 11. Another example of the slicing will be described later as a variation.

[2-2. Hardware Configuration]

(Overall Configuration)

Figure 12:
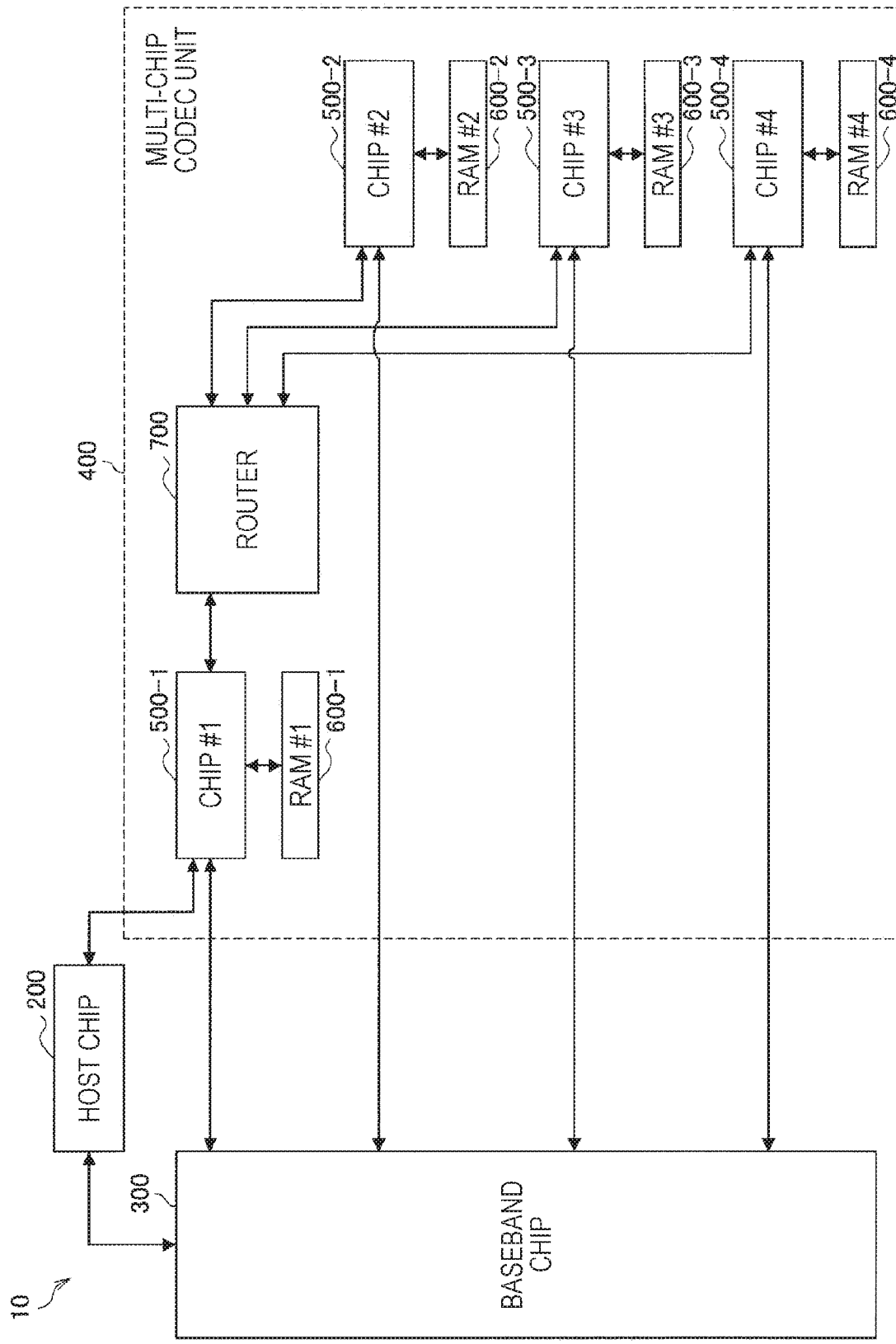
FIG. 12 is a block diagram illustrating an example of a hardware configuration of the image coding apparatus 10.

The configuration of the logical functions of the image coding apparatus 10 has been described above. Next, an example of a hardware configuration that can execute the logical functions of the image coding apparatus 10 above will be described. FIG. 12 is a block diagram illustrating an example of the hardware configuration of the image coding apparatus 10.

Referring to FIG. 12, the image coding apparatus 10 includes a host chip 200, a baseband chip 300, and a multi-chip codec unit 400.

The host chip 200 controls the entire apparatus. The host chip 200 also inputs/outputs an encoded stream to/from the multi-chip codec unit 400. The host chip 200 may also have the function of the area division control unit 111 illustrated in FIG. 10.

The baseband chip 300 inputs image data to the multi-chip codec unit 400 under the control of the host chip 200.

The multi-chip codec unit 400 includes chips 500-1 to 500-4, RAMs 600-1 to 600-4, and a router 700 as illustrated in FIG. 12.

The chip 500-1 encodes the partial area A11 input from the baseband chip 300. Moreover, the chip 500-1 is connected to the host chip 200 to perform control communication associated with the encoding processing and input/output of the encoded stream. The chip 500-1 is also connected to the chips 500-2 to 500-4 via the router 700, and may perform overall control associated with the encoding processing as well as stream aggregation, distribution, and the like. Note that a detailed configuration of the chip 500-1 will be described later with reference to FIG. 13.

Moreover, the chips 500-2 and 500-3 encode the partial areas A12 to A14 input from the baseband chip 300, respectively.

The RAMs 600-1 to 600-4 are dynamic random access memories (DRAMs) connected to the chips 500-1 to 500-4, respectively. The RAMs 600-1 to 600-4 are used as main memories for storing image data, data related to the encoding processing, programs, and the like by the chips 500-1 to 500-4, respectively.

The router 700 is connected to the chips 500-1 to 500-4 to perform interconnection and communication control between the chips.

(Chip Configuration)

Figure 13:
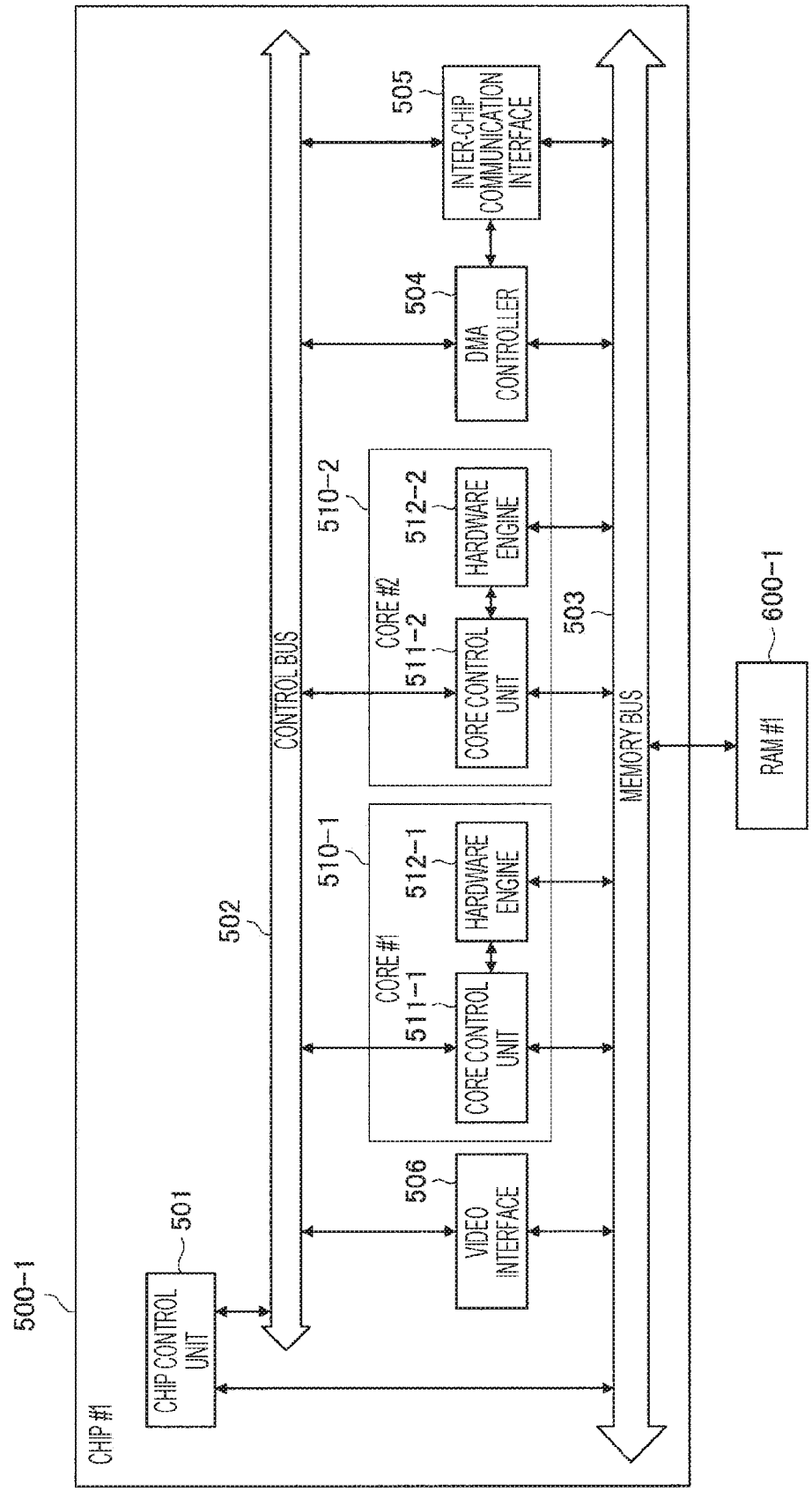
FIG. 13 is a block diagram for explaining an example of a configuration of a chip 500-1.

FIG. 13 is a block diagram for explaining an example of a configuration of the chip 500-1. Referring to FIG. 13, the chip 500-1 includes a chip control unit 501, a control bus 502, a memory bus 503, a DMA controller 504, an inter-chip communication interface 505, a video interface 506, and cores 510-1 and 510-2.

The chip control unit 501 is a processor such as a central processing unit (CPU), and controls the whole chip 500-1 by executing a program stored in the RAM 600-1. Moreover, by executing a program stored in the RAM 600-1, the chip control unit 501 has the function of the slicing control unit 112-1 described with reference to FIG. 10. That is, as described with reference to FIG. 11, the chip control unit 501 divides the partial area A11 into the slice S1 and the slice S2 as the slicing control unit 112-1, thereby assigning the slice S1 to the core 510-1 and the slice S2 to core 510-2, for example.

The control bus 502 is a bus for mutually connecting the units included in the chip 500-1 and accessing a control register that controls the units.

The memory bus 503 is a bus for accessing an intra-chip memory (not shown) and the RAM 600-1 from each unit included in the chip 500-1.

The DMA controller 504 performs direct memory access (DMA) control. The DMA controller 504 controls communication with another chip via the inter-chip communication interface 505, thereby controlling transfer of referenced data (decoded image data) and input/output of an encoded stream, for example.

The inter-chip communication interface 505 is an interface that performs broadband communication with another chip under the control of the DMA controller 504. The inter-chip communication interface 505 may be a high-speed communication interface such as PCI-Express, for example. Note that the chip 500-1 is connected to the host chip 200 and the router 700 as illustrated in FIG. 12, and may thus have two inter-chip communication interfaces 505.

The video interface 506 inputs or outputs image data. The video interface 506 is connected to the baseband chip 300 illustrated in FIG. 12, and image data of the partial area A11 is input from the baseband chip 300 to the video interface 506, for example.

The cores 510-1 and 510-2 are codec cores that encode slices assigned by the chip control unit 501. As described above, the core 510-1 may be in charge of encoding the slice SL1, and the core 510-2 may be in charge of encoding the slice SL2. The cores 510-1 and 510-2 can also access the RAM 600-1 via the memory bus 503. For example, the cores 510-1 and 510-2 cause the RAM 600-1 to store referenced data obtained by local decoding. The cores 510-1 and 510-2 can thus refer to each other's assigned area (slice) by accessing the RAM 600-1 when performing motion compensation. Note that the RAMs 600-1 to 600-4 are connected to the different chips as illustrated in FIG. 12 so that, in order for the cores 510-1 and 510-2 to refer to the area (partial area) assigned to another chip, inter-chip communication via the inter-chip communication interface 505 is required. Such inter-chip communication is slower than access to the RAM. Therefore, by adopting the configuration that allows the plurality of cores within the same chip to access the same RAM (memory), each core can refer to the area (slice) assigned to another core within the same chip faster as compared to the case of referring to the area (partial area) assigned to another chip.

The cores 510-1 and 510-2 may execute programs stored in the RAM 600-1 to have the functions of the subtraction unit 13, the orthogonal transform unit 14, the quantization unit 15, the lossless encoding unit 16, the rate control unit 18, the inverse quantization unit 21, the inverse orthogonal transform unit 22, the addition unit 23, the deblocking filter 24, the SAO filter 25, the switch 27, the mode setting unit 28, the intra prediction unit 30, the inter prediction unit 40, and the like described with reference to FIG. 9.

Moreover, as illustrated in FIG. 13, the cores 510-1 and 510-2 include core control units 511-1 and 511-2 and hardware engines 512-1 and 512-2, respectively.

The core control units 511-1 and 511-2 are processors such as CPUs and perform overall control on the cores 510-1 and 510-2, respectively. For example, the core control units 511-1 and 511-2 execute programs that control the hardware engines 512-1 and 512-2. The core control units 511-1 and 511-2 may also have the function of the rate control unit 18 and the like.

The hardware engines 512-1 and 512-2 are in charge of processing with a large amount of computation (pixel value computation for image data, arithmetic computation for encoding, and the like), the required performance of which is difficult for the CPU to achieve, for example.

The hardware configuration of the chip 500-1 has been described above. Note that although the hardware configuration of the chip 500-1 has been described above, the chips 500-2 to 500-4 can similarly have the chip control unit 501, the control bus 502, the memory bus 503, the DMA controller 504, the inter-chip communication interface 505, the video interface 506, and cores.

Moreover, the number of the cores included in each of the chips 500-2 to 500-4 may be two, as with the number of cores included in the chip 500-1. Note that in the following, the description will be made assuming that the chip 500-2 has a core 510-3 and a core 510-4, the chip 500-3 has a core 510-5 and a core 510-6, and the chip 500-4 has a core 510-7 and a core 510-8. Furthermore, the description will be made assuming that the cores 510-3 to 510-8 encode the slices SL3 to SL8 illustrated in FIG. 11, respectively.

<3. Flow of Processing in Encoding>

[3-1. Flowchart]

Figure 14:
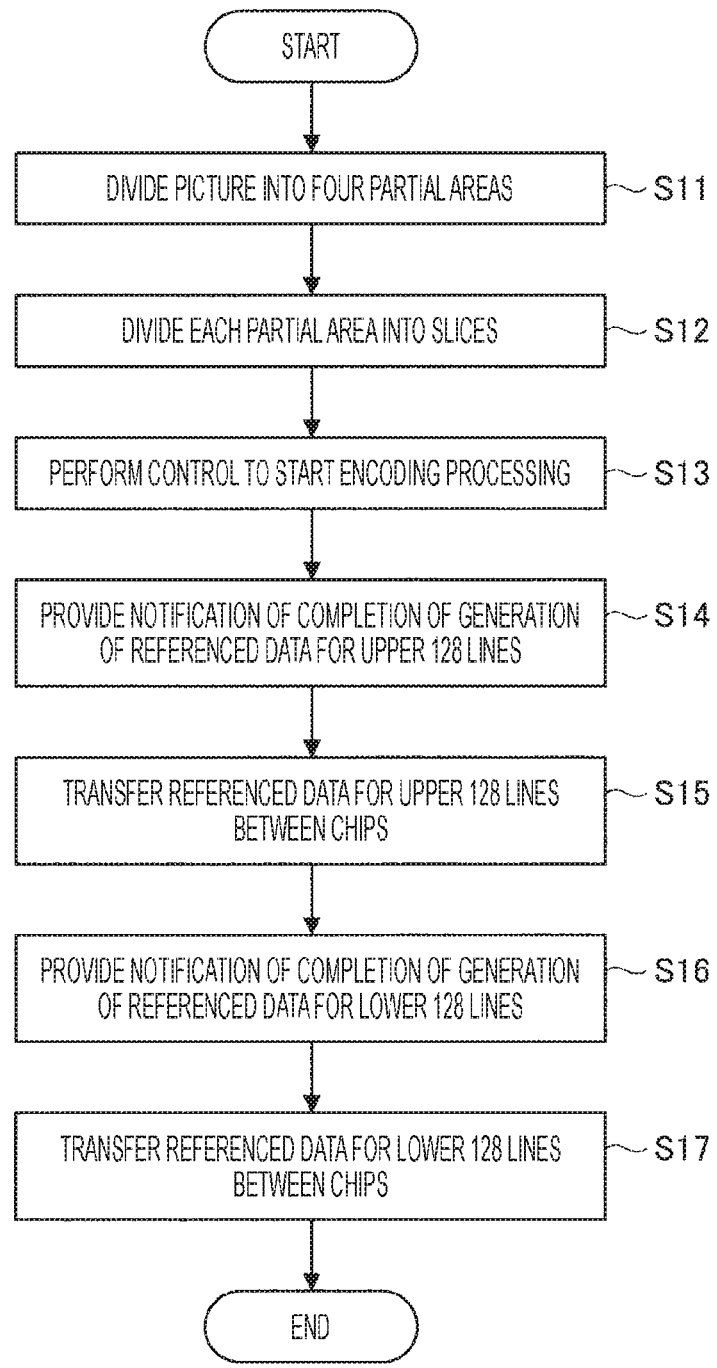
FIG. 14 is a flowchart illustrating an example of a flow of the encoding processing according to the embodiment.

FIG. 14 is a flowchart illustrating an example of a flow of the encoding processing according to the present embodiment. The processing from step S11 to step S17 of FIG. 14 is repeated for each frame, for example.

First, the host chip 200 functions as the area division control unit 111 and sets the first boundary, thereby dividing a picture (image) into four partial areas (S11). Subsequently, the chip control units 501 of the chips 500-1 to 500-4 function as the slicing control units 112-1 to 112-4, respectively, and divide each partial area into a plurality of slices (S12).

In step S12, the second boundary can be set such that the plurality of slices included in each partial area has unequal numbers of lines as described above. Moreover, the second boundary can be set such that the lowest slice situated at the bottom among the plurality of slices included in each partial area is not the slice having the most lines in the partial area.

Subsequently, the chip control units 501 of the chips 500-1 to 500-4 assign the slices divided in step S12 to the cores of each chip, control each core to start the encoding processing, and start the encoding processing of the slices assigned to the cores (S13).

In the chips 500-2 to 500-4, when generation of referenced data for upper 128 lines (local decoding) is completed, the core control unit of the core in charge of encoding the upper slice notifies the chip control unit 501 of the completion of generation of the referenced data (S14). Subsequently, the chip control unit 501 controls the DMA controller 504 and causes the referenced data for the upper 128 lines generated to be transferred to another chip via the inter-chip communication interface 505 (S15). For example, in step S15, the chip control unit 501 of the chip 500-2 controls the DMA controller 504 and causes the referenced data for the upper 128 lines stored in the RAM 600-2 to be transferred to the chip 500-1 via the inter-chip communication interface 505.

In the chips 500-1 to 500-3, when generation of referenced data for lower 128 lines (local decoding) is completed, the core control unit of the core in charge of encoding the lower slice notifies the chip control unit 501 of the completion of generation of the referenced data (S16). Subsequently, the chip control unit 501 controls the DMA controller 504 and causes the referenced data for the lower 128 lines generated to be transferred to another chip via the inter-chip communication interface 505 (S16). For example, in step S17, the chip control unit 501 of the chip 500-1 controls the DMA controller 504 and causes the referenced data for the lower 128 lines stored in the RAM 600-1 to be transferred to the chip 500-2 via the inter-chip communication interface 505.

[3-2. Timing Diagram]

Figure 15:
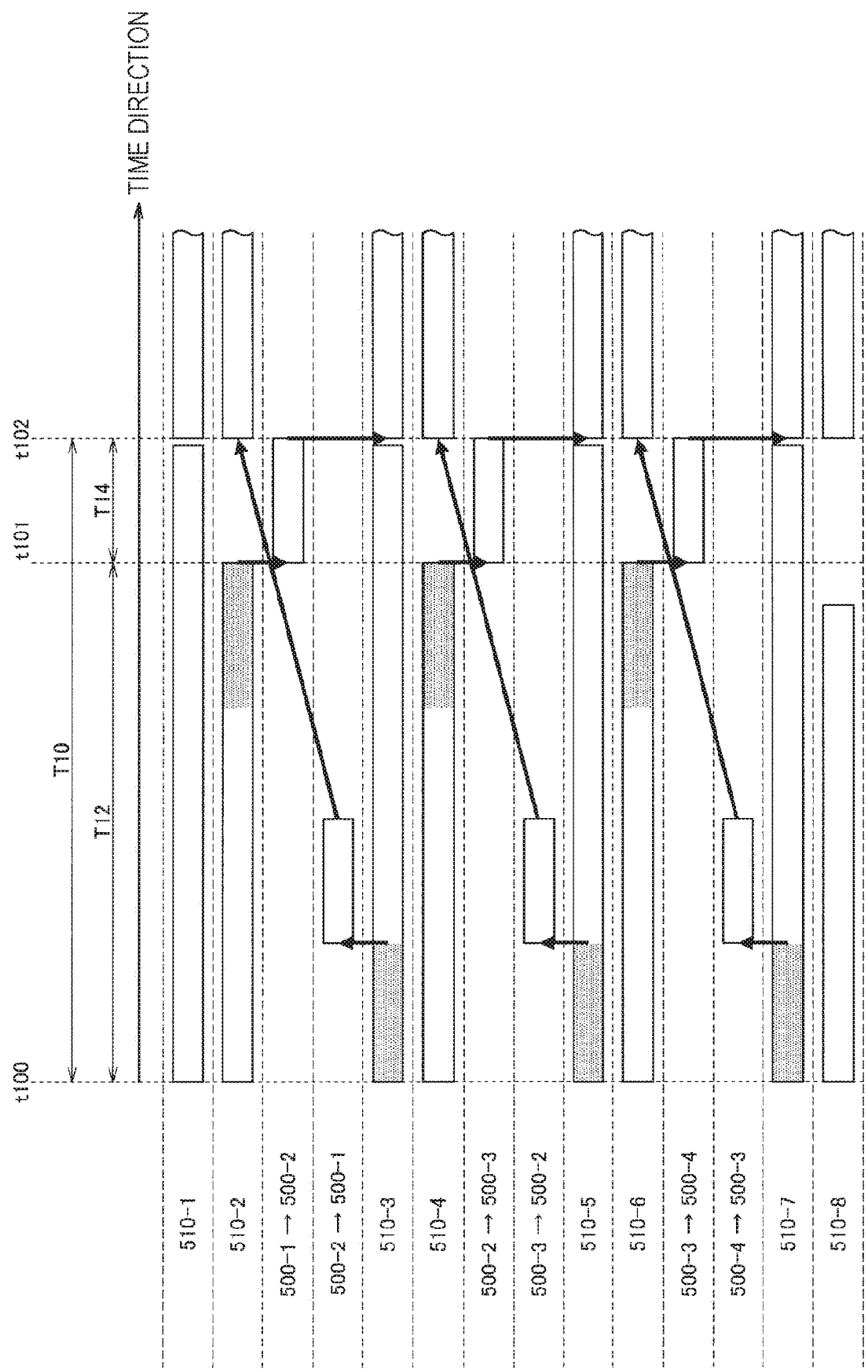
FIG. 15 is a timing diagram illustrating an example of a timing for the encoding processing in each core and for the transfer of referenced data between chips according to the embodiment.

FIG. 15 is a timing diagram illustrating an example of a timing for the encoding processing in each core and for the transfer of the referenced data between chips according to the present embodiment. FIG. 15 illustrates a timing for the encoding processing in each of the cores 510-1 to 510-8, and a timing for the transfer of the referenced data between chips (between the chip 500-1 and the chip 500-2, between the chip 500-2 and the chip 500-3, and between the chip 500-3 and the chip 500-4).

In the example illustrated in FIG. 15, a period T12 is required from the start of processing of a processing target frame at time t100 to time t101 at which the processing by the core 510-2, the core 510-4, and the core 510-6 each in charge of encoding the lower slice (lowest slice) of the partial area is completed. Then, a period T14 is required from time t901 to time t102 at which the transfer of the referenced data generated by the core 510-2, the core 510-4, and the core 510-6 is completed. However, the transfer of the referenced data generated by the core 510-2, the core 510-4, and the core 510-6 can be executed in parallel with the processing by the core 510-1, the core 510-3, the core 510-5, and the core 510-7 each in charge of encoding the upper slice of the partial area. With such a configuration, a period T10 that is the overall processing time can be shorter than the period T90 illustrated in FIG. 7.

Note that in FIG. 15, the processing by the core 510-1, the core 510-3, the core 510-5, and the core 510-7 is completed earlier than such transfer of the referenced data, but the present technology is not limited to such an example. Such transfer of the referenced data can be completed earlier than the processing by the cores depending on the performance of each core, the speed of inter-chip communication, the number of lines in each of the upper slice and the lower slice, and the like. In any case, the processing by the core 510-1, the core 510-3, the core 510-5, and the core 510-7 and such transfer of the referenced data are executed in parallel at least in part, so that the overall processing time can be cut down.

For example, in a case where the performance of the inter-chip communication interface 505 related to inter-chip communication is 30 Gbps, the pixel value resolution is 8 bits, and the chroma format is 4:2:2, the time required to transfer the referenced data for 128 lines is obtained as in equation (1).

$$8192 \text{ [pxl]} \times 128 \text{ [line]} \times 8 \text{ [bit]} \times (1+0.5+0.5) \text{ [component]} \div 30 \text{ [Gbps]} = 0.56 \text{ [ms]} \quad (1)$$

Here, in a case where the frame rate is 120 fps, the processing of each core and inter-chip transfer need to be completed within $1/120 = 8.33$ [ms] as described above.

First, let us examine the processing performance required for the cores 910-1 and 910-2 in a case where each slice included in each partial area is obtained by equal division thereof as illustrated in FIG. 2. The number of 16×16 macroblocks (MB) processed by each core is obtained by the following equations (2) and (3).

The number of macroblocks processed by the core 910-1:

$$(8192 \times 544) \div (16 \times 16) = 17408 \text{ [MB]} \quad (2)$$

The number of macroblocks processed by the core 910-2:

$$(8192 \times 544) \div (16 \times 16) = 17408 \text{ [MB]} \quad (3)$$

Moreover, the processing performance required for the cores 910-1 and 910-2 is converted into time allowed per macroblock as in the following equations (4) and (5).

The processing performance required for the core 910-1:

$$8.33 \text{ [ms]} / 17408 \text{ [MB]} = 0.4787 \text{ [μs/MB]} \quad (4)$$

The processing performance required for the core 910-2:

$$(8.33 \text{ [ms]} - 0.56 \text{ [ms]}) / 17408 \text{ [MB]} = 0.4466 \text{ [μs/MB]} \quad (5)$$

The processing performance required in the core design is determined by equation (5), which is a more stringent condition (processing per macroblock needs to be completed in a shorter time), and is 0.4466 [μs/MB].

On the other hand, let us examine the processing performance required for the cores 510-1 and 510-2 according to the present embodiment in a case where each partial area is divided such that the number of lines of the lower slice (the lowest slice) included in each partial area is larger than the number of lines of the upper slice included therein as illustrated in FIG. 11. The number of 16×16 macroblocks (MB) processed by each core is obtained by the following equations (6) and (7).

The number of macroblocks processed by the core 510-1:

$$(8192\times576)\div(16\times16)=18432 \text{ [MB]} \quad (6)$$

The number of macroblocks processed by the core 510-2:

$$(8192\times512)\div(16\times16)=16384 \text{ [MB]} \quad (7)$$

Moreover, the processing performance required for the cores 510-1 and 510-2 is converted into time allowed per macroblock as in the following equations (8) and (9).

The processing performance required for the core 510-1:

$$8.33 \text{ [ms]}/18432 \text{ [MB]}=0.4521 \text{ [μs/MB]} \quad (8)$$

The processing performance required for the core 510-2:

$$(8.33 \text{ [ms]}-0.56 \text{ [ms]})/16384 \text{ [MB]}=0.4746 \text{ [μs/MB]} \quad (9)$$

The processing performance required in the core design is determined by equation (9), which is a more stringent condition (processing per macroblock needs to be completed in a shorter time), and is 0.4521 [μs/MB].

The processing performance required in the core design is compared between equation (5) and equation (9) as in the following equation (10).

$$0.4521 \text{ [us/MB]}/0.4466 \text{ [us/MB]}=1.0588=105.88\% \quad (10)$$

As in equation (10), according to the present embodiment, the above example can obtain an effect of easing the performance requirement by about 6%.

<4. Configuration of Image Decoding Apparatus>

Figure 16:
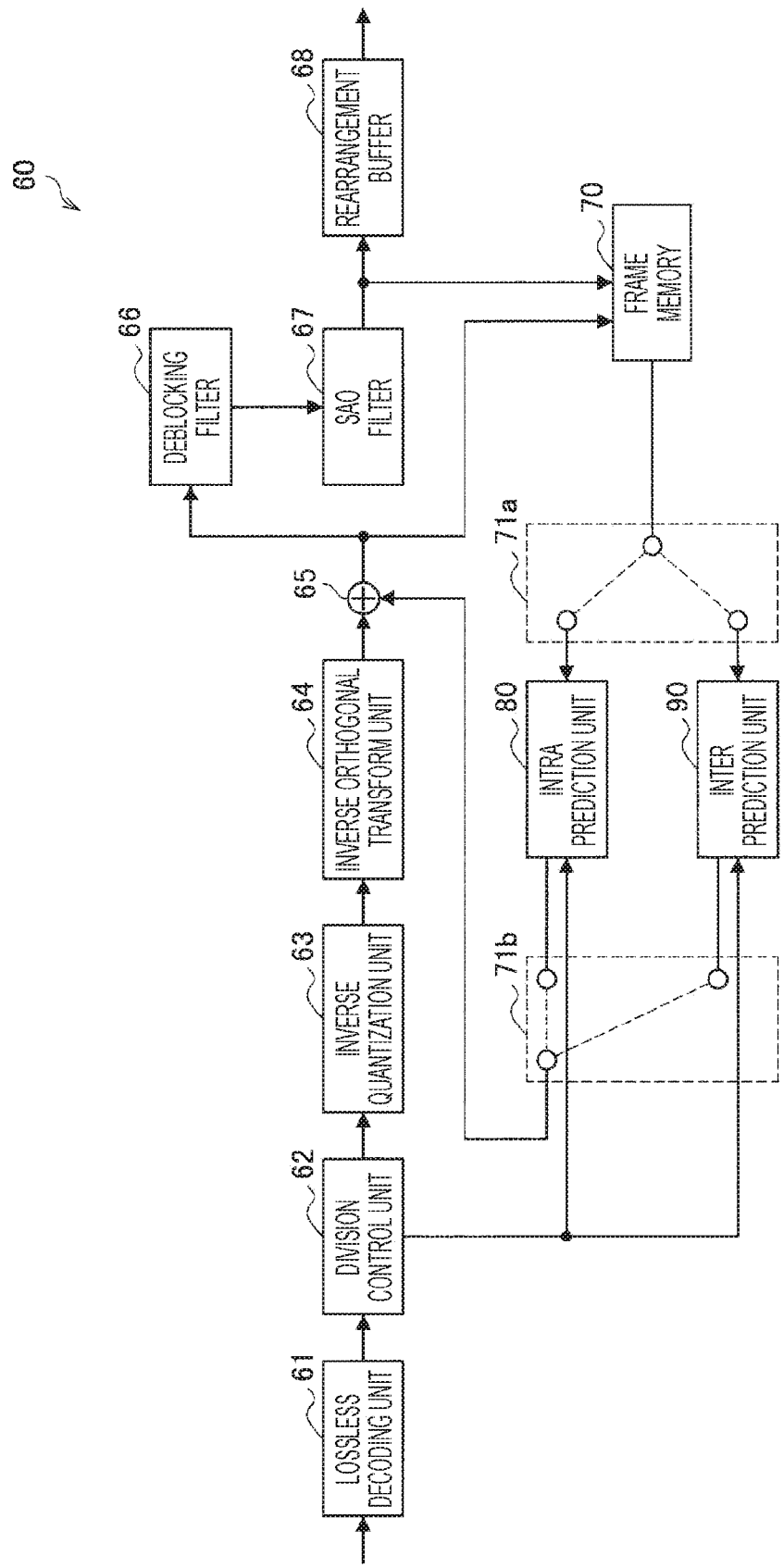
FIG. 16 is a block diagram illustrating an example of a configuration of logical functions of an image decoding apparatus 60 that is an aspect of the image processing apparatus according to the embodiment.

FIG. 16 is a block diagram illustrating an example of a configuration of logical functions of an image decoding apparatus 60 that is an aspect of the image processing apparatus according to the present embodiment. Referring to FIG. 16, the image decoding apparatus 60 includes a lossless decoding unit 61, a division control unit 62, an inverse quantization unit 63, an inverse orthogonal transform unit 64, an addition unit 65, a deblocking filter 66, an SAO filter 67, a rearrangement buffer 68, a frame memory 70, selectors 71a and 71b, an intra prediction unit 80, and an inter prediction unit 90.

The lossless decoding unit 61 decodes encoded image data and encoded parameters from an encoded stream received from the image coding apparatus 10 via a transmission unit not shown (for example, a communication interface or a connection interface with a peripheral device). The parameters decoded by the lossless decoding unit 61 can include a slicing parameter, information associated with intra prediction, and information associated with inter prediction, for example. The lossless decoding unit 61 outputs these data and parameters decoded to the division control unit 62.

The division control unit 62 sets a slice boundary for each image corresponding to a picture according to the slicing parameter, and divides quantized data into a plurality of slices. The processing described below may be executed by a core different for each slice. The division control unit 62 outputs the quantized data decoded to the inverse quantization unit 63. The division control unit 62 further outputs the information associated with intra prediction to the intra prediction unit 80, and the information associated with inter prediction to the inter prediction unit 90. Note that in a case where the slicing parameter is received from the image coding apparatus 10 while included in header information or the like without being encoded, the division control unit 62 may receive the slicing parameter directly from the transmission unit (not shown) instead of the lossless decoding unit 61.

Note that, as with the division control unit 11 described with reference to FIGS. 10 and 11, the division control unit 62 may set a first boundary to divide the quantized data into a plurality of partial areas, and further set a second boundary on the basis of the first boundary to divide each of the partial areas into a plurality of slices. That is, the division control unit 62 can set the second boundary such that the plurality of slices included in each of the partial areas has unequal numbers of lines. Moreover, the division control unit 62 can set the second boundary such that the lowest slice among the plurality of slices included in each partial area is not the slice having the most lines in the partial area.

The slicing is performed as described above so that, among the cores included in each chip, the core in charge of decoding the lowest slice in the partial area assigned to the chip can have less processing load than the other cores. Therefore, the decoding processing of the lowest slice can be completed earlier than the decoding processing of the other slices. Then, when decoded image data obtained by decoding a lower area of the lowest slice is transferred between chips as referenced data, such transfer can be performed simultaneously in parallel with the decoding processing of another slice. As a result, the overall processing time can be cut down.

The inverse quantization unit 63 performs inverse quantization on the quantized data input from the division control unit 62 in the same quantization step as that used at the time of encoding, thereby restoring transform coefficient data. The inverse quantization unit 63 outputs the transform coefficient data restored to the inverse orthogonal transform unit 64.

The inverse orthogonal transform unit 64 performs inverse orthogonal transform on the transform coefficient data input from the inverse quantization unit 63 according to the orthogonal transform method used at the time of encoding, thereby generating prediction error data. The inverse orthogonal transform unit 64 outputs the prediction error data generated to the addition unit 65.

The addition unit 65 adds the prediction error data input from the inverse orthogonal transform unit 64 and predicted image data input from the selector 71b, thereby generating decoded image data. The addition unit 65 then outputs the decoded image data generated to the deblocking filter 66 and the frame memory 70.

The deblocking filter 66 removes block distortion by filtering the decoded image data input from the addition unit 65, and outputs the decoded image data that has been filtered to the SAO filter 67.

The SAO filter 67 removes noise by applying edge offset processing or band offset processing to the decoded image data input from the deblocking filter 66, and outputs the decoded image data that has been processed to the rearrangement buffer 68 and the frame memory 70.

The rearrangement buffer 68 rearranges the images input from the SAO filter 67 to generate a series of image data in time series. The series of image data generated by the rearrangement buffer 68 can then be output as a digital image signal on a display (not shown) connected to the image decoding apparatus 60, for example.

The frame memory 70 uses a storage medium to store the decoded image data before filtering input from the addition unit 65, and the decoded image data after filtering input from the SAO filter 67.

The selector 71a switches the destination of the image data from the frame memory 70 between the intra prediction unit 80 and the inter prediction unit 90 for each block in the image according to mode information acquired by the lossless decoding unit 61. For example, in a case where the intra prediction mode is specified, the selector 71a outputs the decoded image data before filtering supplied from the frame memory 70 to the intra prediction unit 80 as referenced data. Moreover, in a case where the inter prediction mode is specified, the selector 71a outputs the decoded image data after filtering to the inter prediction unit 90 as referenced data.

The selector 71b switches the source of the predicted image data to be supplied to the addition unit 65 between the intra prediction unit 80 and the inter prediction unit 90 according to the mode information acquired by the lossless decoding unit 61. For example, in a case where the intra prediction mode is specified, the selector 71b supplies the predicted image data output from the intra prediction unit 80 to the addition unit 65. Moreover, in a case where the inter prediction mode is specified, the selector 71b supplies the predicted image data output from the inter prediction unit 90 to the addition unit 65.

The intra prediction unit 80 performs intra prediction processing on the basis of the information associated with intra prediction and the referenced data from the frame memory 70, thereby generating the predicted image data. The intra prediction unit 80 then outputs the predicted image data generated to the selector 71b.

The inter prediction unit 90 performs inter prediction processing on the basis of the information associated with inter prediction and the referenced data from the frame memory 70, thereby generating the predicted image data. The inter prediction unit 90 then outputs the predicted image data generated to the selector 71b.

The configuration of the logical functions of the image decoding apparatus 60 has been described above. Note that the logical functions of the image decoding apparatus 60 described above can be implemented by a hardware configuration similar to the hardware configuration of the image coding apparatus 10 described with reference to FIGS. 12 and 13, for example. The logical functions of the image decoding apparatus 60 can be implemented by replacing the encoding processing with the decoding processing as appropriate and reversing the input/output direction of the encoded stream and the image data in the hardware configuration described with reference to FIGS. 12 and 13, for example, whereby a detailed description will be omitted.

<5. Flow of Processing in Decoding>

Figure 17:
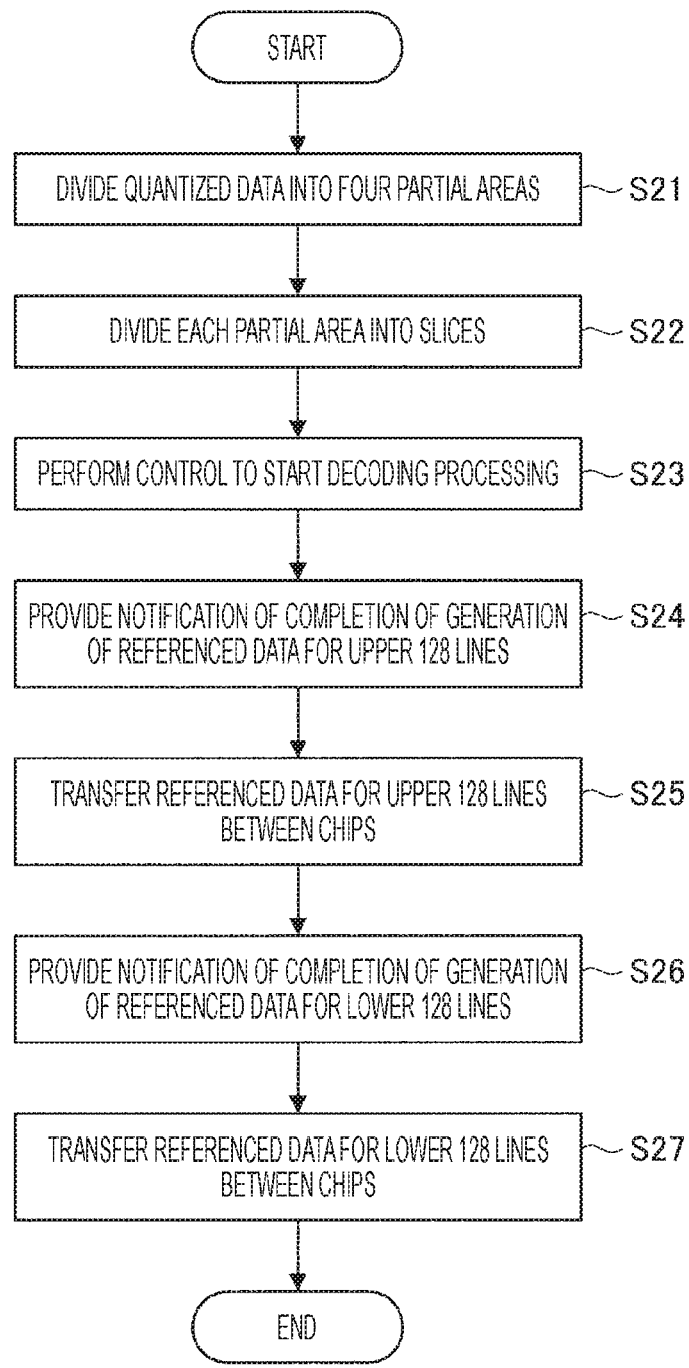
FIG. 17 is a flowchart illustrating an example of a flow of the encoding processing according to the embodiment.

FIG. 17 is a flowchart illustrating an example of a flow of the encoding processing according to the present embodiment. The processing from step S21 to step S27 of FIG. 17 is repeated for each frame, for example.

First, the division control unit 62 sets the first boundary to divide quantized data into four partial areas (S21). Subsequently, the division control unit 62 divides each partial area into a plurality of slices (S22).

In step S22, the second boundary can be set such that the plurality of slices included in each partial area has unequal numbers of lines as described above. Moreover, the second boundary can be set such that the lowest slice situated at the bottom among the plurality of slices included in each partial area is not the slice having the most lines in the partial area.

Subsequently, the slices divided in step S22 are assigned to the cores of each chip included in the image decoding apparatus 60, and the decoding processing is started (S23).

Subsequently, when generation of referenced data for upper 128 lines (decoding) is completed, the core in charge of encoding the upper slice notifies the completion of generation of the referenced data for the upper 128 lines to the chip control unit of the chip including the core (S24). Then, the reference data for the upper 128 lines generated is transferred to another chip that refers to the referenced data (S25).

Subsequently, when generation of referenced data for lower 128 lines (decoding) is completed, the core in charge of encoding the lower slice notifies the completion of generation of the referenced data for the lower 128 lines to the chip control unit of the chip including the core (S26). Then, the reference data for the lower 128 lines generated is transferred to another chip that refers to the referenced data (S27).

Note that the timing for the decoding processing of each core and for the transfer of the referenced data between chips according to the present embodiment is similar to the timing for the encoding processing of each core and for the transfer of the referenced data between chips described with reference to FIG. 15, whereby a detailed description will be omitted here.

<6. Variation>

One embodiment of the present disclosure has been described above. In the following, some variations of the present embodiment will be described. Note that the variations described below may be applied to the present embodiment independently or may be applied to the present embodiment in combination. Moreover, each variation may be applied in place of the configuration described in the present embodiment or may be applied additionally to the configuration described in the present embodiment.

Figure 18:
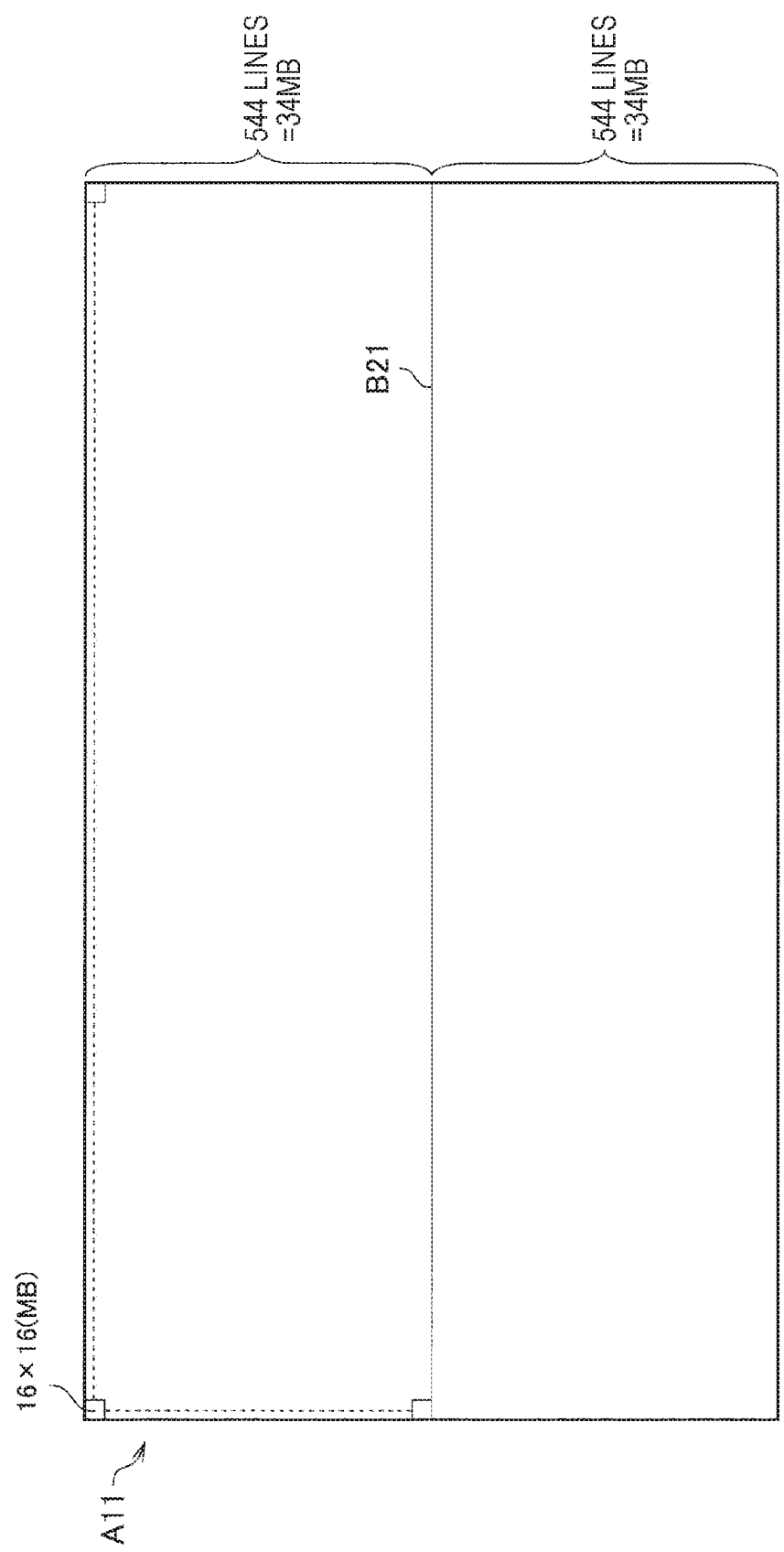
FIG. 18 is an explanatory diagram for explaining an example of setting of a second boundary by the division control unit.
Figure 19:
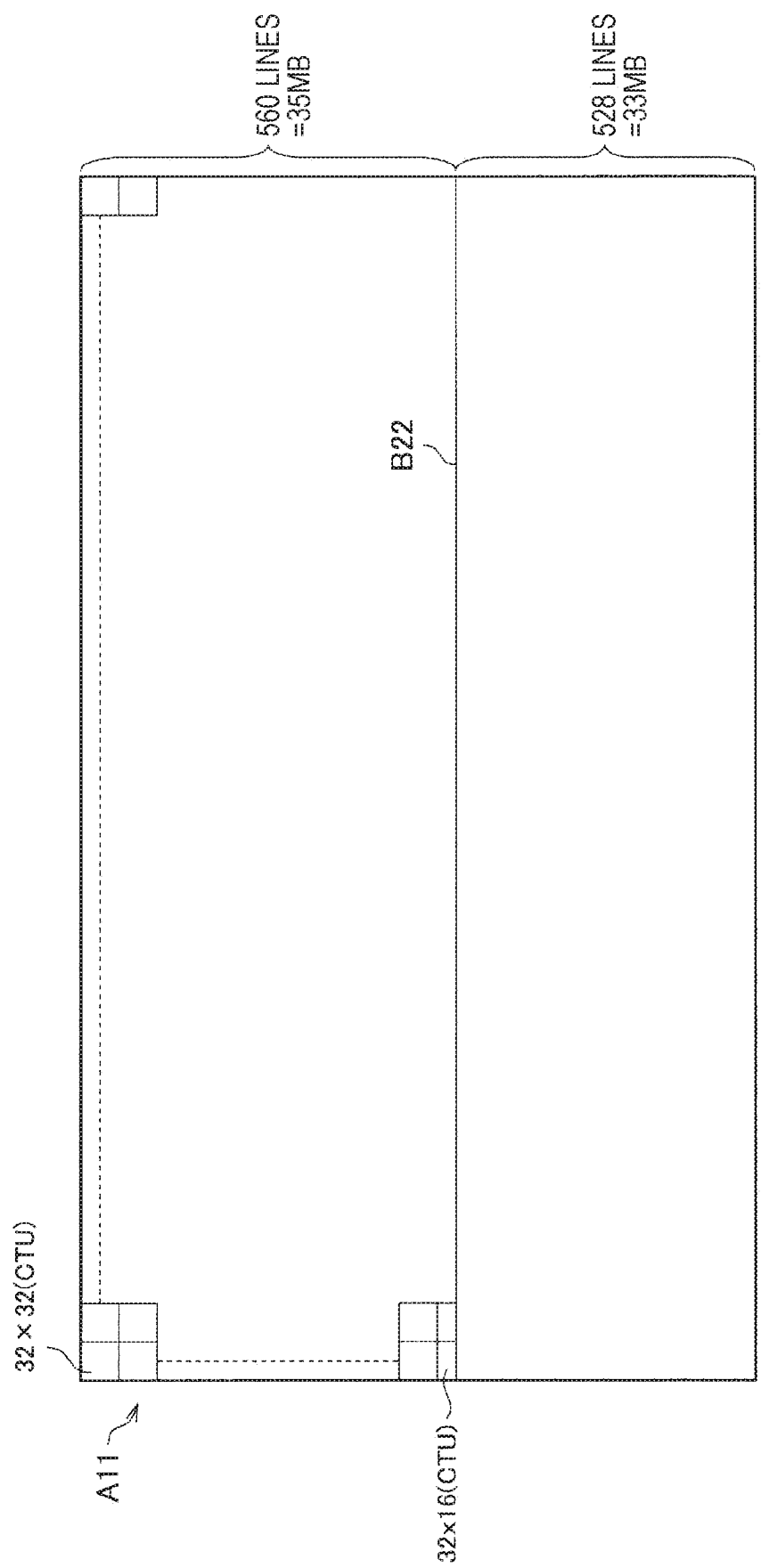
FIG. 19 is an explanatory diagram for explaining an example of setting of the second boundary by the division control unit.

The above embodiment has described the example in which the second boundary is set as illustrated in FIG. 11 to divide the slices included in each partial area, but the present technology is not limited to such an example. In the following, setting of the second boundary by the division control unit will be examined with reference to FIGS. 18 to 20. FIGS. 18 and 19 are explanatory diagrams for explaining examples of setting of the second boundary by the division control unit.

In FIG. 18, the partial area A11 is equally divided as in the example illustrated in FIG. 4. Here, in FIG. 18, an upper slice and a lower slice divided by a slice boundary B21 that is the second boundary each have 544 lines. Here, as illustrated in FIG. 18, when 16×16 macroblocks (MB) are arranged in each slice, 34 macroblocks are lined up vertically in each slice.

In a case where encoding processing and decoding processing are performed with the macroblock as a coding processing unit, it is desirable that the number of lines in each slice be an integer multiple of the number of vertical pixels of the macroblock as described above in terms of processing efficiency. Therefore, even in the case where the division control unit divides each partial area unequally as in the one embodiment, it is desirable to set the second boundary such that the number of lines included in each slice is an integer multiple of the number of vertical pixels of the macroblock (coding processing unit) as described above.

In FIG. 19, the partial area A11 is divided unequally as in the one embodiment of the present disclosure described above. Moreover, in FIG. 19, an upper slice divided by a slice boundary B22 that is the second boundary has 560 lines, and a lower slice divided thereby has 528 lines. Here, 35 macroblocks are lined up vertically in the upper slice, and 33 macroblocks are lined up vertically in the lower slice.

Therefore, in a case where encoding processing and decoding processing are performed with macroblock as the coding processing unit, the processing can be performed efficiently by such slicing.

Incidentally, HEVC introduces the coding processing unit called a CTU larger than the macroblock, so that the CTU having the size that is an even multiple of the macroblock such as 32×32 or 64×64 can be selected as the coding processing unit.

For example, in a case where a 32×32 CTU is to be applied as illustrated in FIG. 19, an odd number of macroblocks are lined up vertically by the slicing performed as illustrated in FIG. 19. As a result, the 32×32 CTU cannot be applied at the slice boundary B22 as illustrated in FIG. 19, which possibly lowers the processing efficiency.

Figure 20:
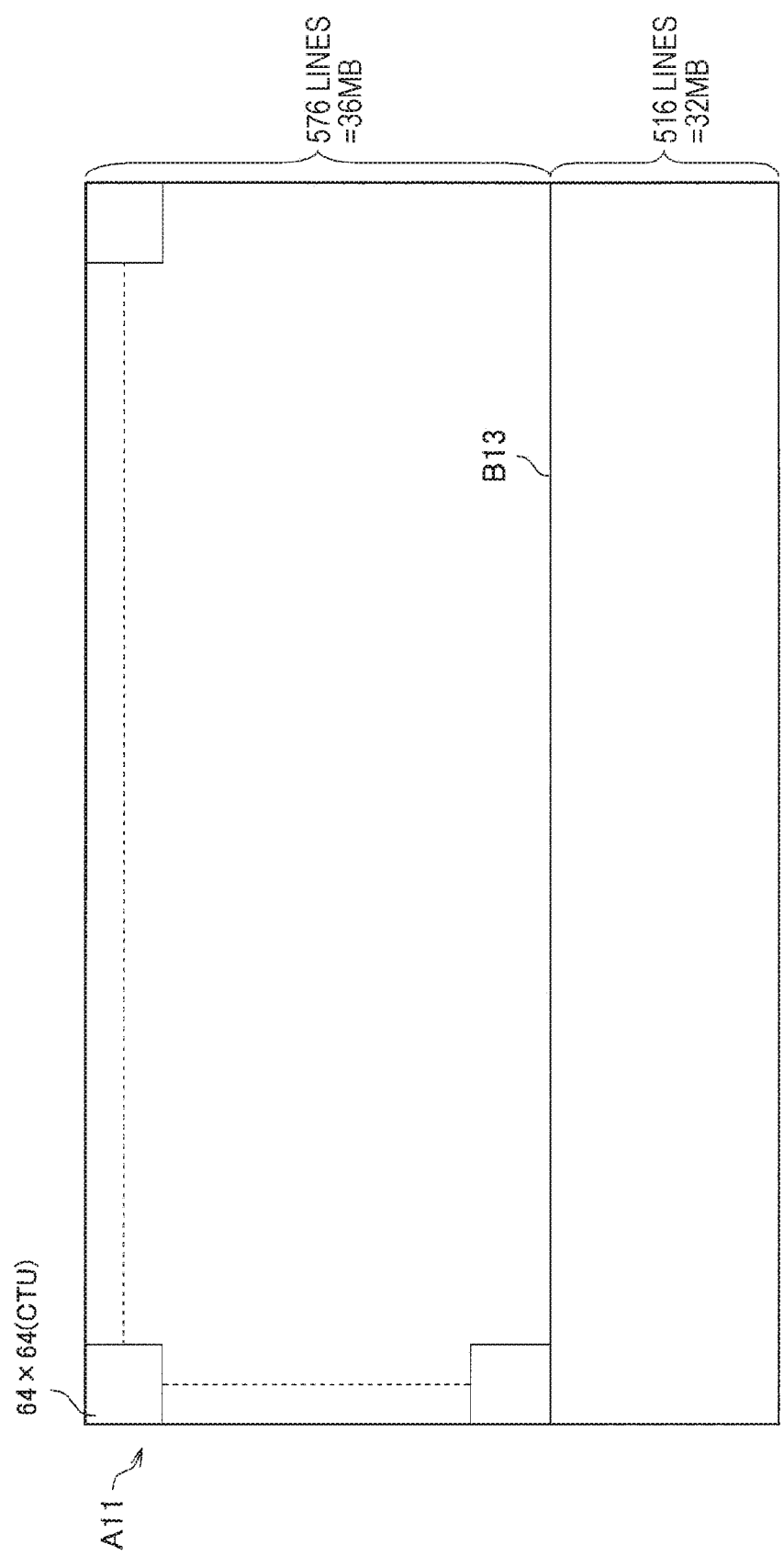
FIG. 20 is an explanatory diagram for explaining an example of setting of the second boundary by the division control unit.

Thus, as illustrated in FIG. 20, it is desirable to perform the slicing such that an even number of macroblocks are lined up vertically in each slice. In an example illustrated in FIG. 20, a larger 64×64 CTU can be applied. In such a way, it is desirable to perform the slicing such that an integer number of coding processing units of as large a size as possible are lined up vertically in each slice. Therefore, it is desirable that the division control unit set the second boundary such that the number of lines included in each slice is an integer multiple of the number of vertical pixels of a largest coding processing unit (largest coding unit (LCU)). With such a configuration, more efficient processing can be expected.

The division control unit may also set the position of the second boundary according to whether or not the inter-chip transfer of referenced data (decoded image data) for the lowest slice is performed, or the amount of transfer between chips.

For example, in a case where referenced data of a picture (image) to be processed is not generated, that is, in a case where the picture is not to be a referenced frame, the inter-chip transfer of referenced data for the lowest slice is not performed. Therefore, in such a case, the processing load of a core in charge of processing the lower slice need not be reduced in order to advance the timing for starting the transfer.

Accordingly, in the case where the picture to be processed is not to be the referenced frame, the division control unit may set the second boundary such that the plurality of slices included in the partial area has equal numbers of lines. According to such a configuration, no transfer is performed between chips, and the slice assigned to each core has an equal size so that, for example, a margin is generated in the processing time of each core to be able to increase the amount of processing for improving image quality or the like.

Moreover, even in a case where the picture to be processed is to be the referenced frame, the referenced data for the lowest slice is not transferred between chips, or the amount of transfer between chips (a referenced range) is reduced in some cases. For example, these can be specified from hierarchical search information (information associated with narrowing of a motion detection range using a result of motion detection performed with coarse accuracy that uses a reduced image or the like in preprocessing) or image feature amount information and the like. For example, in a case where intra prediction (intra-screen prediction) is determined to have better coding efficiency than inter prediction (motion compensation) on the basis of these pieces of information, the referenced data for the lowest slice need not be transferred between chips.

In the case where the referenced data for the lowest slice is not transferred between chips as described above, the division control unit may set the second boundary such that the plurality of slices included in the partial area has equal numbers of lines in a similar manner as described above. According to such a configuration, for example, a margin is generated in the processing time of each core to be able to increase the amount of processing for improving image quality or the like.

The division control unit may also set the second boundary according to the amount of transfer of the referenced data for the lowest slice. For example, the division control unit may set the second boundary such that the smaller the amount of transfer of the referenced data for the lowest slice, the larger the number of lines included in the lowest slice. According to such a configuration, for example, a margin is generated in the processing time of each core according to the amount of transfer of the referenced data for the lowest slice, thereby being able to increase the amount of processing for improving image quality or the like.

<7. Summary>

As described above, according to the embodiment of the present disclosure, the overall processing time can be cut down by performing slicing such that the slice situated at the bottom in the partial area processed by each chip is not the slice having the most lines in the partial area.

Moreover, the following effects can be obtained by easing the processing performance requirement of the core for achieving the overall processing time.

For example, in a case where a clock frequency of the core is reduced, an effect of a decrease in the circuit scale can be obtained by reducing a clock frequency condition given as a condition at the time of design (such as logic synthesis). Alternatively, an effect of a decrease in power consumption can be obtained by reducing the clock frequency at the time of operation.

Moreover, if the operation is performed at the same clock frequency, the amount of computation that affects image quality can be increased. For example, the range of motion detection can be expanded, or the complexity of an algorithm for rate control (code amount allocation control) can be increased so that an improvement in image quality can be expected.

Furthermore, a decrease in DRAM bandwidth requirements leads to a reduction in a DRAM clock frequency so that an effect of a decrease in power consumption or a decrease in component cost by lowering of the speed grade of the DRAM used can be obtained.

The preferred embodiment of the present disclosure has been described in detail with reference to the drawings, but the technical scope of the present disclosure is not limited to such examples. Various modifications or alterations will become apparent to those skilled in the art of the present disclosure without departing from the scope of the technical ideas described in the claims, and it is to be understood that these naturally belong to the technical scope of the present disclosure.

For example, each step in the above embodiment does not necessarily have to be processed in time series in the order described as the flowchart. For example, each step in the processing of the above embodiment may be processed in an order different from the order described as the flowchart or may be processed in parallel.

Moreover, the number of chips and the number of cores included in the image coding apparatus 10 and the image decoding apparatus 60 according to the embodiment of the present disclosure are not limited to the example described above. The multi-chip configuration or multi-core configuration need only be adopted, where various configurations can be implemented.

It is also possible to create a computer program for implementing the functions of the image coding apparatus 10 and the image decoding apparatus 60 according to the embodiment of the present disclosure as described above. Also, a computer-readable recording medium that stores such a computer program can be provided. The recording medium includes, for example, a magnetic disk, an optical disk, a magneto-optical disk, a flash memory, or the like. Moreover, the above computer program may be distributed via, for example, a network without using the recording medium.

Furthermore, the effects described in the present specification are merely illustrative or exemplary, and not restrictive. In other words, the technology according to the present disclosure can exhibit other effects apparent to those skilled in the art from the description of the present specification in addition to or instead of the effects described above.

Note that the following configurations are also within the technical scope of the present disclosure.

(1)
An image processing apparatus including:
a division control unit that, on the basis of a first boundary dividing an image into a plurality of partial areas, further sets a second boundary and divides each of the partial areas into a plurality of slices; and
an encoding unit that encodes the image on the basis of the first boundary and the second boundary, in which
the division control unit sets the second boundary such that the plurality of slices included in the partial area has unequal numbers of lines, and the slice situated at the bottom among the plurality of slices included in the partial area is not a slice having the most lines in the partial area.

(2)
The image processing apparatus according to (1), in which
the image processing apparatus further includes a plurality of chips,
each of the chips has a plurality of cores, and
the cores have a function of the encoding unit.

(3)
The image processing apparatus according to (2), in which
the core encodes one of the slices specified on the basis of the first boundary and the second boundary, and
the chip encodes one of the partial areas.

(4)
The image processing apparatus according to (3), in which the division control unit sets the second boundary according to an amount of transfer, between the chips, of decoded image data related to the slice situated at the bottom.

(5)
The image processing apparatus according to (4), in which the amount of transfer is specified on the basis of hierarchical search information or image feature amount information.

(6)
The image processing apparatus according to (4) or (5), in which in a case where the decoded image data of the slice situated at the bottom is not transferred between the chips, the division control unit sets the second boundary such that the plurality of slices included in the partial area has equal numbers of lines.

(7)
The image processing apparatus according to (6), in which in a case where the image is not to be a referenced frame, the division control unit sets the second boundary such that the plurality of slices included in the partial area has equal numbers of lines.

(8)
The image processing apparatus according to any one of (1) to (7), in which the division control unit sets the second boundary such that the number of lines in each of the plurality of slices included in the partial area is an integer multiple of the number of vertical pixels of a coding unit.

(9)
The image processing apparatus according to (8), in which the division control unit sets the second boundary such that the number of lines in each of the plurality of slices included in the partial area is an integer multiple of the number of vertical pixels of a largest coding unit.

(10)
An image processing method including:
on the basis of a first boundary dividing an image into a plurality of partial areas, further setting a second boundary and dividing each of the partial areas into a plurality of slices; and
encoding the image on the basis of the first boundary and the second boundary, in which
the second boundary is set such that the plurality of slices included in the partial area has unequal numbers of lines, and the slice situated at the bottom among the plurality of slices included in the partial area is not a slice having the most lines in the partial area.

REFERENCE SIGNS LIST

10 Image coding apparatus
11 Division control unit
16 Lossless encoding unit
60 Image decoding apparatus
61 Lossless decoding unit
62 Division control unit
111 Area division control unit
112-1 to 112-4 Slicing control unit
200 Host chip
300 Baseband chip
400 Multi-chip codec unit
500-1 to 500-2 Chip
501 Chip control unit
510-1 to 510-8 Core

The invention claimed is:
1. An image processing apparatus, comprising:
a plurality of chips;
a division control unit configured to:
set, based on a first boundary that divides an image into a plurality of partial areas, a second boundary; and
divide each of the plurality of partial areas into a plurality of slices based on the second boundary, wherein
each of the plurality of slices of a specific partial area of the plurality of partial areas includes unequal numbers of lines,
a specific slice of the plurality of slices of the specific partial area is at a bottom position in the specific partial area among each of the plurality of slices of the specific partial area,
the specific slice includes a smaller number of lines in the specific partial area among the plurality of slices of the specific partial area, the second boundary is associated with an amount of transfer of decoded image data between the plurality of chips, and the decoded image data is related to the specific slice; and an encoding unit configured to encode the image based on the first boundary and the second boundary.

2. The image processing apparatus according to claim 1, wherein each of the plurality of chips has a plurality of cores, and each of the plurality of cores is configured to perform a function of the encoding unit.

3. The image processing apparatus according to claim 2, wherein a specific core of the plurality of cores is configured to encode one of the plurality of slices of at least one of the plurality of partial areas based on the first boundary and the second boundary, and a specific chip of the plurality of chips is configured to encode one of the plurality of partial areas.

4. The image processing apparatus according to claim 1, wherein the amount of transfer is specified based on one of hierarchical search information or image feature amount information.

5. The image processing apparatus according to claim 1, wherein based on the decoded image data that is not transferrable between the plurality of chips, the division control unit is further configured to set the second boundary, and each of the plurality of slices in the specific partial area includes equal numbers of lines.

6. The image processing apparatus according to claim 5, wherein based on the image that is not associated with a referenced frame, the division control unit is further configured to set the second boundary, and each of the plurality of slices in the specific partial area includes equal numbers of lines.

7. The image processing apparatus according to claim 1, wherein the number of lines in each of the plurality of slices in the specific partial area is an integer multiple of a number of vertical pixels of a coding unit.

8. The image processing apparatus according to claim 7, wherein the number of lines in each of the plurality of slices in the specific partial area is an integer multiple of a number of vertical pixels of a largest coding unit.

9. An image processing method, comprising:

in an image processing apparatus:

setting, based on a first boundary that divides an image into a plurality of partial areas, a second boundary;

dividing each of the plurality of partial areas into a plurality of slices based on the second boundary, wherein each of the plurality of slices of a specific partial area of the plurality of partial areas includes unequal numbers of lines, a specific slice of the plurality of slices of the specific partial area is at a bottom position in the specific partial area among each of the plurality of slices of the specific partial area, the specific slice includes a smaller number of lines in the specific partial area among the plurality of slices, the second boundary is associated with an amount of transfer of decoded image data between a plurality of chips of the image processing apparatus, and the decoded image data is related to the specific slice; and encoding the image based on the first boundary and the second boundary.

* * * * *